(12) United States Patent
Asahi et al.

(10) Patent No.: US 8,697,246 B2
(45) Date of Patent: Apr. 15, 2014

(54) ANTISTATIC HARDCOAT LAYER-FORMING COMPOSITION, OPTICAL FILM, PRODUCTION METHOD OF OPTICAL FILM, POLARIZING PLATE AND IMAGE DISPLAY DEVICE

(75) Inventors: Miho Asahi, Kanagawa (JP); Daiki Wakizaka, Kanagawa (JP); Takayasu Yamazaki, Kanagawa (JP); Kenichi Fukuda, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 115 days.

(21) Appl. No.: 13/200,590

(22) Filed: Sep. 27, 2011

(65) Prior Publication Data
US 2012/0077047 A1    Mar. 29, 2012

(30) Foreign Application Priority Data

Sep. 28, 2010 (JP) ................. 2010-217969
Mar. 25, 2011 (JP) ................. 2011-068882

(51) Int. Cl.
| | | |
|---|---|---|
| *B32B 23/08* | (2006.01) | |
| *B32B 27/30* | (2006.01) | |
| *B05D 5/06* | (2006.01) | |
| *B05D 3/02* | (2006.01) | |

(52) U.S. Cl.
USPC ......... 428/522; 428/510; 427/164; 427/372.2

(58) Field of Classification Search
None
See application file for complete search history.

(56) References Cited

U.S. PATENT DOCUMENTS

| | | | | |
|---|---|---|---|---|
| 6,921,576 B2 * | 7/2005 | Terauchi et al. | ............... | 428/404 |
| 2004/0225052 A1 * | 11/2004 | Bialke et al. | .................. | 524/501 |

FOREIGN PATENT DOCUMENTS

| | | |
|---|---|---|
| JP | 2003-039619 | 2/2003 |
| JP | 2004-191916 A | 7/2004 |
| JP | 2005-316428 | 11/2005 |
| JP | 2009-086660 | 4/2009 |
| JP | 2009-263567 | 11/2009 |
| WO | WO 03/055950 | 7/2003 |

* cited by examiner

*Primary Examiner* — Sheeba Ahmed
(74) *Attorney, Agent, or Firm* — Jean C. Edwards; Edwards Neils PLLC

(57) ABSTRACT

A antistatic hard coat layer-forming composition having the following (a), (b), (c) and (d): (a) an ion-conducting compound, (b) a polyethylene oxide compound having one or more photopolymerizable groups, having no hydroxyl group, and having a $—(CH_2CH_2O)_k—$ structure (wherein k represents a number of 1 to 50), (c) a compound having an unsaturated double bond, and (d) a photopolymerization initiator.

11 Claims, No Drawings

ANTISTATIC HARDCOAT LAYER-FORMING COMPOSITION, OPTICAL FILM, PRODUCTION METHOD OF OPTICAL FILM, POLARIZING PLATE AND IMAGE DISPLAY DEVICE

CROSS-REFERENCE TO RELATED APPLICATION(S)

This application claims priority from Japanese Patent Application Nos. 2010-217969, filed Sep. 28, 2010 and 2011-068882, filed on Mar. 25, 2011, the contents of all of which are herein incorporated by reference in their entirety.

BACKGROUND

1. Field

The present invention relates to an antistatic hard coat layer-forming composition, an optical film, a production method of an optical film, a polarizing plate, and an image display device.

2. Description of the Related Art

In an image display device such as a cathode ray tube display device (CRT), a plasma display panel (PDP), an electroluminescent display (ELD), a vacuum fluorescent display (VFD), a field emission display (FED) and a liquid crystal display device (LCD), a transparent optical film having an antistatic property and a hard coat property is suitably provided to prevent reduction in visibility due to scratching of the display surface or attachment of dusts or the like.

In order to obtain an optical film having an antistatic property and a hard coat property, it is known to form an antistatic hard coat layer by using a composition containing an ion-conducting compound as an antistatic agent, such as quaternary ammonium salt group-containing polymer, and a polyfunctional monomer functioning to a binder (see, for example, JP-A-2009-263567 (the term "JP-A" as used herein means an "unexamined published Japanese patent application"), JP-A-2005-316428, JP-A-2009-86660 and JP-A-2003-39619).

Here, due to bad compatibility between the ion-conducting compound and the polyfunctional monomer, the ion-conducting compound is aggregated and unless the ion-conducting compound is added in a large amount, a sufficient antistatic property is not obtained. However, when the ion-conducting compound is added in a large amount, an adequate hard coat property may not be obtained.

In order to solve this problem, for example, WO 03/055950 describes an optical film having an antistatic hard coat layer formed of a composition containing a quaternary ammonium salt group-containing polymer, a polyfunctional monomer and, as a compatibilizer, 2-hydroxyethyl acrylate.

SUMMARY

However, when a compatibilizer having a hydroxyl group is added so as to ensure the compatibility of an ion-conducting compound with a polyfunctional monomer as in WO 03/055950, a strong interaction occurs between the compatibilizer having a hydroxyl group and the ion-conducting compound and this may rather deteriorate the antistatic property.

An object of the present invention is to provide an antistatic hard coat layer-forming composition capable of giving an optical film having an antistatic hard coat layer excellent in the antistatic property.

Another object of the present invention is to provide an optical film having a hard coat layer excellent in the antistatic property.

Still another object of the present invention is to provide a production method of the optical film, a polarizing plate using the optical film as a polarizing plate protective film, and an image display device having the optical film or the polarizing plate.

The present inventors have made intensive studies to solve those problems and found that the above-described objects can be attained by the following techniques.

(1) A antistatic hard coat layer-forming composition having the following (a), (b), (c) and (d): (a) an ion-conducting compound, (b) a polyethylene oxide compound having one or more photopolymerizable groups, having no hydroxyl group, and having a —$(CH_2CH_2O)_k$— structure (wherein k represents a number of 1 to 50), (c) a compound having an unsaturated double bond, and (d) a photopolymerization initiator.

(2) The antistatic hard coat layer-forming composition according to (1), wherein the ratio of the polyethylene oxide compound (b) is from 1 to 30 weight % based on the entire solid content of the antistatic hard coat layer-forming composition.

(3) The antistatic hard coat layer-forming composition according to (1), wherein the polyethylene oxide compound (b) is a compound represented by the following formula (b1):

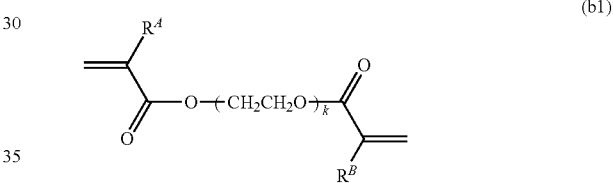

(b1)

wherein each of $R^A$ and $R^B$ independently represents a hydrogen atom or a methyl group, and k represents a number of 1 to 50.

(4) The antistatic hard coat layer-forming composition according to (1), wherein the molecular weight of the polyethylene oxide compound (b) is 2,000 or less.

(5) The antistatic hard coat layer-forming composition according to (1), wherein the ratio of the formula weight of the —$(CH_2CH_2O)_k$— structure occupying in the molecular weight of the polyethylene oxide compound (b) is from 40 to 90%.

(6) The antistatic hard coat layer-forming composition according to (1), wherein the ion-conducting compound (a) is a quaternary ammonium salt group-containing polymer.

(7) The antistatic hard coat layer-forming composition according to (1), wherein the ion-conducting compound (a) is a polymer having at least one unit selected from structural units represented by the following formulae (I) to (III):

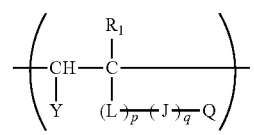

Formula (I)

wherein $R_1$ represents a hydrogen atom, an alkyl group, a halogen atom or —$CH_2COO^-$ $M^+$, Y represents a hydrogen atom or —$COO^-M^+$, $M^+$ represents a proton or a cation, L represents —CONH—, —COO—, —CO— or —O—, J represents an alkylene group, an arylene group or a group composed of a combination thereof, and Q represents a group selected from the following group A:

A:

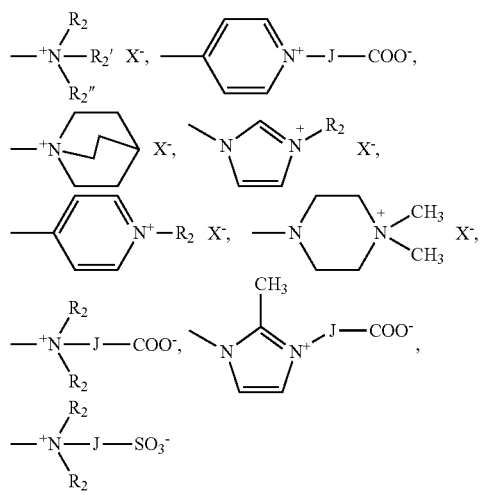

wherein each of $R_2$, $R_2'$ and $R_2''$ independently represents an alkyl group, J represents an alkylene group, an arylene group or a group composed of a combination thereof, $X^-$ represents an anion, and each of p and q independently represents 0 or 1;

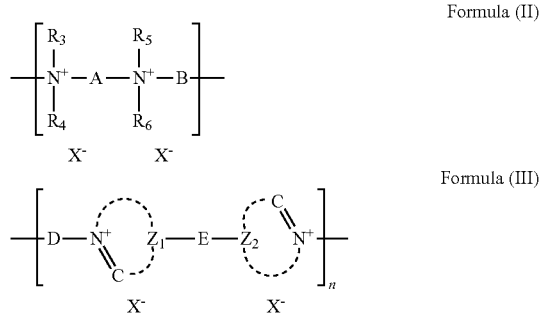

wherein each of $R_3$, $R_4$, $R_5$ and $R_6$ independently represents an alkyl group, each of a pair of $R_3$ and $R_4$ and a pair of $R_5$ and $R_6$ may combine together to form a nitrogen-containing heterocyclic ring, each of A, B and D independently represents an alkylene group, an arylene group, an alkenylene group, an arylenealkylene group, —$R_7COR_8$—, —$R_9COOR_{10}OCOR_{11}$—, —$R_{12}OCR_{13}COOR_{14}$—, —$R_{15}$—$(OR_{16})_m$—, —$R_{17}CONHR_{18}NHCOR_{19}$—, —$R_{20}OCONHR_{21}NHCOR_{22}$— or —$R_{23}NHCONHR_{24}NHCONHR_{25}$—, E represents a single bond, an alkylene group, an arylene group, an alkenylene group, an arylenealkylene group, —$R_7COR_8$—, —$R_9COOR_{10}OCOR_{11}$—, —$R_{12}OCR_{13}COOR_{14}$—, —$R_{15}$—$(OR_{16})_m$—, —$R_{17}CONHR_{18}NHCOR_{19}$—, —$R_{20}OCONHR_{21}NHCOR_{22}$—, —$R_{23}NHCONHR_{24}NHCONHR_{25}$— or —NHCOR$_{26}$CONH—, each of $R_7$, $R_8$, $R_9$, $R_{11}$, $R_{12}$, $R_{14}$, $R_{15}$, $R_{16}$, $R_{17}$, $R_{19}$, $R_{20}$, $R_{22}$, $R_{23}$, $R_{25}$ and $R_{26}$ represents an alkylene group, each of $R_{10}$, $R_{13}$, $R_{18}$, $R_{21}$ and $R_{24}$ independently represents a linking group selected from an alkylene group, an alkenylene group, an arylene group, an arylenealkylene group and an alkylenearylene group, m represents a positive integer of 1 to 4, $X^-$ represents an anion, each of $Z_1$ and $Z_2$ represents a nonmetallic atom group necessary for forming a 5- or 6-membered ring together with the —N=C— group and may combine with E in a quaternary salt form =N$^+$[X$^-$]—, and n represents an integer of 5 to 300.

(8) An optical film having a transparent substrate having thereon an antistatic hard coat layer formed of the antistatic hard coat layer-forming composition according to (1).

(9) The optical film according to (8), wherein the transparent substrate is a cellulose acylate film.

(10) A polarizing plate having the optical film according to (8) as a polarizing plate protective film.

(11) An image display device having the optical film according to (8).

(12) An image display device having the polarizing plate according to (10).

(13) A method for producing an optical film having an antistatic hard coat layer on a cellulose acylate film substrate, having: coating and curing the antistatic hard coat layer-forming composition according to (1) on the cellulose acylate film substrate so as to form an antistatic hard coat layer.

According to the present invention, an antistatic hard coat layer-forming composition capable of providing an optical film having an antistatic hard coat layer excellent in the antistatic property can be provided.

Also, according to the present invention, an optical film having a hard coat layer excellent in the antistatic property can be provided.

Furthermore, according to the present invention, a production method of the optical film, a polarizing plate using the optical film as a protective film for a polarizing plate, and an image display device having the optical film or the polarizing plate can be provided.

In addition, according to the present invention, an antistatic hard coat layer-forming composition capable of providing an optical film having an antistatic hard coat layer excellent in the hardness with a pencil hardness of 2H or more as well as in the antistatic property can be provided.

DETAILED DESCRIPTION OF INVENTION

The mode for carrying out the present invention is described in detail below, but the present invention is not limited thereto. Incidentally, the expression "from (numerical value 1) to (numerical value 2)" as used in the present specification, for indicating a physical value, a characteristic value or the like, means "(numerical value 1) or more and (numerical value 2) or less". Also, the term "(meth)acrylate" as used in the present specification means "at least either acrylate or methacrylate". The same applies to "(meth)acrylic acid" and "(meth)acryloyl".

In the present invention, the terms "a repeating unit corresponding to the monomer" and "a repeating unit derived from the monomer" mean that the component obtained after polymerization of the monomer becomes a repeating unit.

The present invention relates to an antistatic hard coat layer-forming composition having the following (a), (b), (c) and (d):

(a) an ion-conducting compound,
(b) a polyethylene oxide compound having one or more photopolymerizable groups, having no hydroxyl group, and having a —$(CH_2CH_2O)_k$— structure (wherein k represents a number of 1 to 50),
(c) a compound having an unsaturated double bond, and
(d) a photopolymerization initiator.

(a) Ion-Conducting Compound

The hard coat layer-forming composition of the present invention contains an ion-conducting compound. The ion-conducting compound has good compatibility with the later-described polyethylene oxide compound (b), and this is expected to allow for expansion of the polymer chain of the ion-conducting polymer and in turn, leads to significant enhancement of electrical conductivity. Furthermore, it is considered that the polyethylene oxide chain of the polyethylene oxide compound (b) forms hydrogen bonding with water contained in air, and this leads to a rise in the percentage of water retention of the hard coat layer and produces an effect of increasing the ion conductivity of the ion-conducting compound. A general electron-conducting compound is not high in the compatibility with a polyethylene oxide compound and at the same time, does not involve a material transfer through a medium (such as water). Therefore, the effect of enhancing the electrical conductivity by the increase in the percentage of water retention is considered to be smaller than in the present invention.

The ion-conducting compound (a) for use in the present invention includes ion-conducting compounds such as cationic, anionic, nonionic and amphoteric compounds.

Among these, a cationic or nonionic compound making it easy to obtain the effects of the present invention is preferred, and from the standpoint that the antistatic performance of the compound is high, a quaternary ammonium base group-containing compound (cationic compound) is more preferred.

The quaternary ammonium salt group-containing compound used may be either a low molecular type or a polymer type, but a polymer-type cationic antistatic agent is more preferably used from the standpoint that the antistatic property is not fluctuated by bleed-out or the like.

The polymer-type quaternary ammonium salt group-containing cationic compound may be appropriately selected from known compounds and used, but in view of high ion conductivity, a quaternary ammonium salt group-containing polymer is preferred, and a polymer having at least one unit selected from the structural units represented by the following formulae (I) to (III) is preferred.

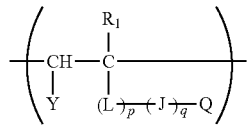

Formula (I)

In formula (I), $R_1$ represents a hydrogen atom, an alkyl group, a halogen atom or —$CH_2COO^-M^+$, Y represents a hydrogen atom or —$COO^-M^+$, $M^+$ represents a proton or a cation, L represents —CONH—, —COO—, —CO— or —O—, J represents an alkylene group, an arylene group or a group composed of a combination thereof, and Q represents a group selected from the following group A:

A:

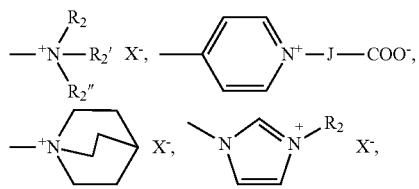

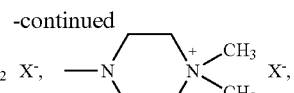

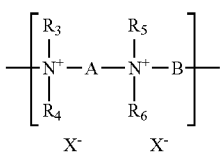

In the above formulae, each of $R_2$, $R_2'$ and $R_2''$ independently represents an alkyl group, J represents an alkylene group, an arylene group or a group composed of a combination thereof, $X^-$ represents an anion, and each of p and q independently represents 0 or 1.

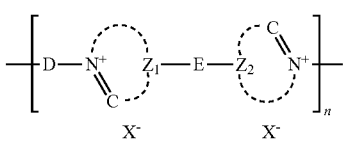

Formula (II)

Formula (III)

In formulae (II) and (III), each of $R_3$, $R_4$, $R_5$ and $R_6$ independently represents an alkyl group, each of a pair of $R_3$ and $R_4$ and a pair of $R_5$ and $R_6$ may combine together to form a nitrogen-containing heterocyclic ring.

Each of A, B and D independently represents an alkylene group, an arylene group, an alkenylene group, an arylenealkylene group, —$R_7COR_8$—, —$R_9COOR_{10}OCOR_{11}$—, —$R_{12}OCR_{13}COOR_{14}$—, —$R_{15}$—$(OR_{16})_m$—, —$R_{17}CONHR_{18}NHCOR_{19}$—, —$R_{20}OCONHR_{21}NHCOR_{22}$— or —$R_{23}NHCONHR_{24}NHCONHR_{25}$—, E represents a single bond, an alkylene group, an arylene group, an alkenylene group, an arylenealkylene group, —$R_7COR_8$—, —$R_9COOR_{10}OCOR_{11}$—, —$R_{12}OCR_{13}COOR_{14}$—, —$R_{15}$—$(OR_{16})_m$—, —$R_{17}CONHR_{18}NHCOR_{19}$—, —$R_{20}OCONHR_{21}NHCOR_{22}$—, —$R_{23}NHCONHR_{24}NHCONHR_{25}$— or —$NHCOR_{26}CONH$—, each of $R_7$, $R_8$, $R_9$, $R_{11}$, $R_{12}$, $R_{14}$, $R_{15}$, $R_{16}$, $R_{17}$, $R_{19}$, $R_{20}$, $R_{22}$, $R_{23}$, $R_{25}$ and $R_{26}$ represents an alkylene group, each of $R_{10}$, $R_{13}$, $R_{18}$, $R_{21}$ and $R_{24}$ independently represents a linking group selected from an alkylene group, an alkenylene group, an arylene group, an arylenealkylene group and an alkylenearylene group, m represents a positive integer of 1 to 4, and $X^-$ represents an anion.

Each of $Z_1$ and $Z_2$ represents a nonmetallic atom group necessary for forming a 5- or 6-membered ring together with the —N=C— group and may link with E in a quaternary salt form $=N^+[X^-]$—.

n represents an integer of 5 to 300.

The groups of formulae (I) to (III) are described below.

The halogen atom includes a chlorine atom and a bromine atom and is preferably a chlorine atom.

The alkyl group is preferably a branched or linear alkyl group having a carbon number of 1 to 4, more preferably a methyl group, an ethyl group or a propyl group.

The alkylene group is preferably an alkylene group having a carbon atom of 1 to 12, more preferably a methylene group, an ethylene group or a propylene group, still more preferably an ethylene group.

The arylene group is preferably an arylene group having a carbon number of 6 to 15, more preferably a phenylene group, a diphenylene group, a phenylmethylene group, a phenyldimethylene group or a naphthylene group, still more preferably a phenylmethylene group. These groups may have a substituent.

The alkenylene group is preferably an alkenylene group having a carbon number of 2 to 10, and the arylenealkylene group is preferably an arylenealkylene group having a carbon number of 6 to 12. These groups may have a substituent.

Examples of the substituent which may be substituted on each group include a methyl group, an ethyl group and a propyl group.

In formula (I), $R_1$ is preferably a hydrogen atom.

Y is preferably a hydrogen atom.

J is preferably a phenylmethylene group.

Q is preferably a group represented by the following formula (VI) selected from the group A, wherein each of $R_2$, $R_2'$ and $R_2''$ is a methyl group.

$X^-$ includes, for example, a halogen ion, a sulfonate anion and a carboxylate anion and is preferably a halogen ion, more preferably a chlorine ion.

Each of p and q is preferably 0 or 1, and more preferably, p=0 and q=1.

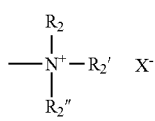

Formula (VI)

In formulae (II) and (III), each of $R_3$, $R_4$, $R_5$ and $R_6$ is preferably a substituted or unsubstituted alkyl group having a carbon number of 1 to 4, more preferably a methyl group or an ethyl group, still more preferably a methyl group.

Each of A, B and D is independently preferably a substituted or unsubstituted alkylene, arylene, alkenylene or arylenealkylene group having a carbon number of 2 to 10, more preferably a phenyldimethylene group.

$X^-$ includes, for example, a halogen ion, a sulfonate anion and a carboxylate anion and is preferably a halogen ion, more preferably a chlorine ion.

E is preferably a single bond, an alkylene group, an arylene group, an alkenylene group or an arylenealkylene group.

Examples of the 5- or 6-membered ring formed by $Z_1$ or $Z_2$ together with the —N=C— group include a diazoniabicyclooctane ring.

Specific examples of the compound having a structural unit represented by formulae (I) to (III) are illustrated below, but the present invention is not limited thereto. In specific examples, out of indices (m, x, y, z, r and actual numerical values), m indicates the number of repeating units in each unit, and each of x, y, z and r indicates the molar ratio of respective units.

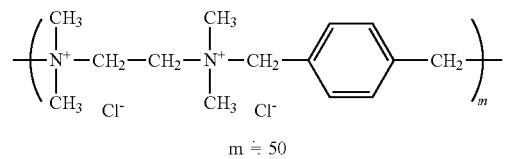

IP-1 m ≒ 50

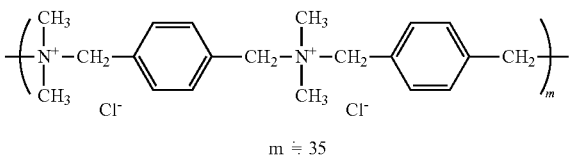

IP-2 m ≒ 35

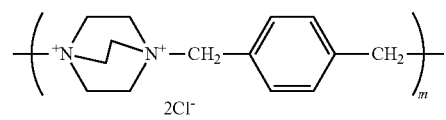

IP-3 m ≒ 50

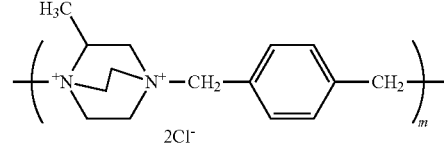

IP-4 m ≒ 50

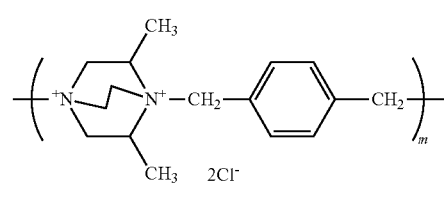

IP-5 m ≒ 50

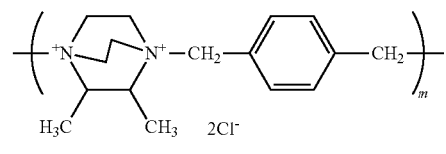

IP-6 m ≒ 50

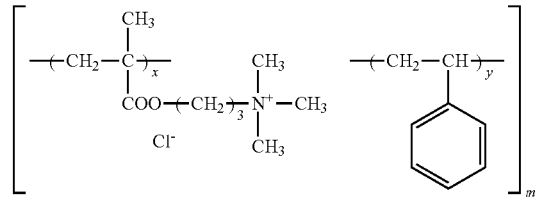

IP-7 x:y = 60:40 m ≒ 80

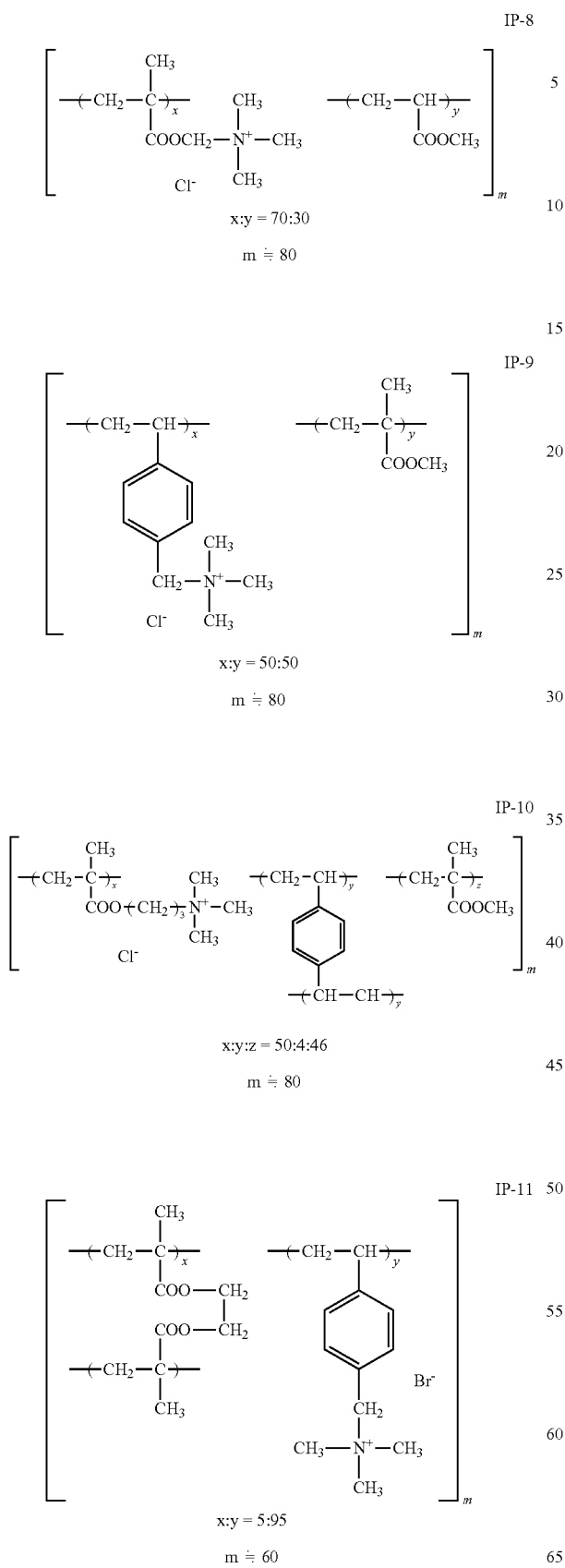

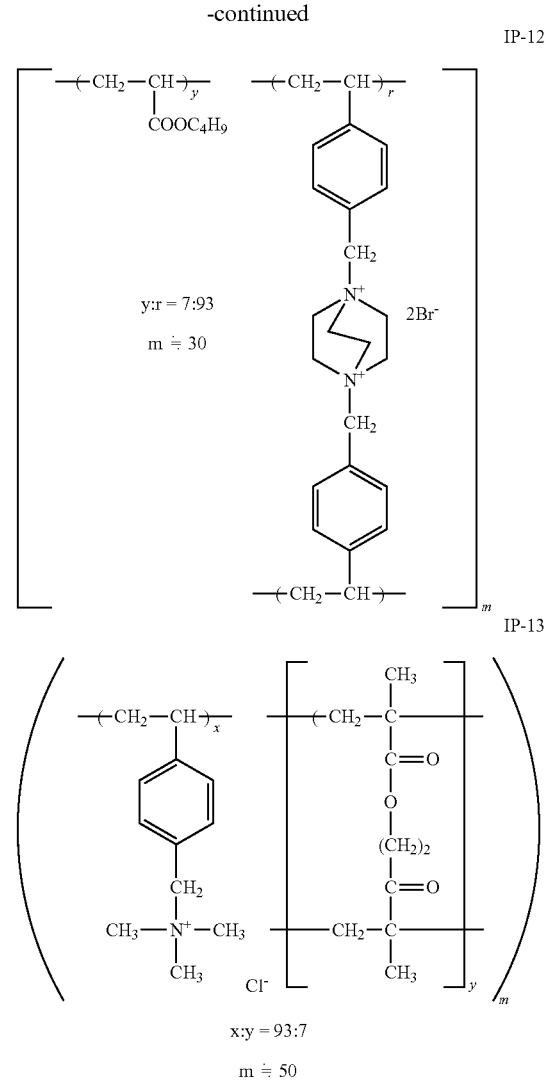

As for the electrically conductive compounds illustrated above, one compound may be used alone, or two or more compounds may be used in combination. An antistatic compound having a polymerizable group in the molecule of the antistatic agent can increase the scratch resistance (film strength) of the antistatic layer and is more preferred.

As the ion-conducting compound (a), a commercial product may be also used, and examples thereof include "Light-Ester DQ-100", product name (produced by Kyoeisha Chemical Co., Ltd.), "LIODURAS LAS-1211", product name (produced by Toyo Ink Co., Ltd.), "SHIKO UV-AS-102", product name (produced by Nippon Gosei Kayaku K.K.), and "NK Oligo U-601, 201" (produced by Shin-Nakamura Chemical Co., Ltd.)

The quaternary ammonium salt group-containing polymer which is suitably used as the ion-conducting compound in the present invention may have additionally a polymerization unit other than the structural unit represented by formulae (I) to (III) (ionic structural unit). By virtue of having a polymerization unit other than the ionic structural unit, the ion-conducting compound is expected to be more increased in the compatibility with the polyethylene oxide compound and develop excellent electrical conductivity and moreover, at the preparation of the composition, solubility in a solvent or compatibility with an unsaturated double bond-containing compound or a photopolymerization initiator can be enhanced.

Examples of the monomer which can be used as a polymerization unit other than the ionic structural unit include the following compounds.

<(a-2) Compound Having an Alkylene Oxide Chain>

The (a-2) compound having an alkylene oxide chain is represented by the following formula (2) and can be obtained, for example, by ring-opening polymerization of ethylene oxide with an alkyl alcohol and then transesterification reaction with methyl (meth)acrylate or reaction with (meth) acrylic acid chloride.

$$CH_2=C(R^5)COO(AO)_nR^6 \qquad (2)$$

In formula (2), $R^5$ represents H or $CH_3$, $R^6$ represents hydrogen or a hydrocarbon group having a carbon number of 1 to 22, n represents an integer of 2 to 200, and A represents an alkylene group having a carbon number of 2 to 4).

In formula (2), the alkylene oxide group (AO) is an alkylene oxide group having a carbon number of 2 to 4, and examples thereof include an ethylene oxide group, a propylene oxide group and a butylene oxide group. Also, alkylene oxide groups differing in the carbon number may be present in the same monomer.

The number (n) of alkylene oxide groups is an integer of 2 to 200, preferably an integer of 10 to 100. If the number is 2 or less or 101 or more, a sufficient compatibility with the later-described unsaturated double bond-containing compound may not be obtained.

$R^6$ is hydrogen or a hydrocarbon group having a carbon number of 1 to 22. If the carbon number is 23 or more, the raw material is expensive and this is not practical.

As the hydrocarbon group having a carbon number of 1 to 22, a substituted or unsubstituted hydrocarbon group may be selected. An unsubstituted hydrocarbon group is preferred, and an unsubstituted alkyl group is preferred. As the unsubstituted alkyl group, an alkyl group having or not having a branch may be used. Two or more kinds thereof may be used in combination.

Specific examples of the (a-2) compound having an alkylene oxide chain include polyethylene glycol mono(meth)acrylate, polypropylene glycol mono(meth)acrylate, polybutylene glycol mono(meth)acrylate, poly(ethylene glycol-propylene glycol) mono(meth)acrylate, poly(ethylene glycol-tetramethylene glycol) mono(meth)acrylate, poly(propylene glycol-tetramethylene glycol) mono(meth)acrylate, polyethylene glycol mono(meth)acrylate monomethyl ether, polyethylene glycol mono(meth)acrylate monooctyl ether, polyethylene glycol mono(meth)acrylate monobenzyl ether, polyethylene glycol mono(meth)acrylate monophenyl ether, polyethylene glycol mono(meth)acrylate monodecyl ether, polyethylene glycol mono(meth)acrylate monododecyl ether, polyethylene glycol mono(meth)acrylate monotetradecyl ether, polyethylene glycol mono(meth)acrylate hexadecyl ether, polyethylene glycol mono(meth)acrylate monooctadecyl ether, poly(ethylene glycol-propylene glycol) mono(meth)acrylate octyl ether, poly(ethylene glycol-propylene glycol) mono(meth)acrylate octadecyl ether, and poly(ethylene glycol-propylene glycol) mono(meth)acrylate nonylphenyl ether.

<(a-3) Compound Copolymerizable with (a-2)>

Furthermore, (a-3) a compound copolymerizable with (a-2) may be arbitrarily radical-copolymerized, if desired.

The (a-3) compound copolymerizable with (a-2) may be sufficient if it is a compound having one ethylenically unsaturated group, and the compound is not particularly limited, but examples thereof include an alkyl (meth)acrylate such as methyl (meth)acrylate, ethyl (meth)acrylate, propyl (meth)acrylate, butyl (meth)acrylate, 2-ethylhexyl (meth)acrylate, dodecyl (meth)acrylate and octadecyl (meth)acrylate; a hydroxyalkyl (meth)acrylate such as hydroxyethyl (meth)acrylate, hydroxypropyl (meth)acrylate and hydroxybutyl (meth)acrylate; various (meth)acrylates such as benzyl (meth)acrylate, cyclohexyl (meth)acrylate, isobornyl (meth)acrylate, dicyclopentenyl (meth)acrylate, dicyclopentenyloxyethyl (meth)acrylate, ethoxyethyl (meth)acrylate, ethylcarbitol (meth)acrylate, butoxyethyl (meth)acrylate, cyanoethyl (meth)acrylate, and glycidyl (meth)acrylate; styrene; and methylstyrene.

From the standpoint that the amount is large enough to impart antistatic property and less likely to impair the film hardness, the content of the ion-conducting compound (a) in the antistatic hard coat layer-forming composition of the present invention is preferably from 1 to 30 weight %, more preferably from 3 to 20 weight %, still more preferably from 5 to 15 weight %, based on the entire solid content in the antistatic hard coat layer-forming composition.

[(b) Polyethylene Oxide Compound]

The (b) polyethylene oxide compound having one or more photopolymerizable groups, having no hydroxyl group and having a $—(CH_2CH_2O)_k—$ structure (wherein k represents a number of 1 to 50), contained in the antistatic hard coat layer-forming composition of the present invention, is described below.

The polyethylene oxide compound (b) has one or more photopolymerizable groups, has no hydroxyl group and has a $—(CH_2CH_2O)_k—$ structure (wherein k represents a number of 1 to 50).

The polyethylene oxide compound having a photopolymerizable group exhibits good compatibility with the ion-conducting compound (a), which allows for expansion of the ion-conducting polymer (electrically conductive polymer) (a) and in turn, leads to significant enhancement of electrical conductivity. Furthermore, the polyethylene oxide chain of the polyethylene oxide compound forms hydrogen bonding with water contained in air, and this leads to a rise in the percentage of water retention of the hard coat layer and produces an effect of increasing the ion conductivity of the ion-conducting compound. As a result, the ion-conducting compound (a) can develop sufficient electrical conductivity even when used in a small amount, and an antistatic hard coat layer excellent in the electrical conductivity and the film hardness can be formed.

The polyethylene oxide compound having a photopolymerizable group, which is used in the present invention, does not have a hydroxyl group. Due to this configuration, good compatibility of the ion-conducting compound can be ensured without deteriorating the antistatic property due to strong interaction between a hydroxyl group and the ion-conducting compound, and excellent antistatic property can be realized.

In view of preventing bleed-out and not impairing the hardness of the antistatic hard coat layer, the number of photopolymerizable groups in the polyethylene oxide compound (b) is, in terms of the amount of a functional group or the like, preferably from 10 to 2,000 g·mol$^{-1}$, more preferably from 50 to 1,000 g·mol$^{-1}$, still more preferably from 100 to 500 g·mol$^{-1}$. The specific number of functional groups is preferably from 1 to 18, more preferably from 2 to 6, still more preferably from 2 to 4.

Examples of the photopolymerizable group contained in the polyethylene oxide compound (b) include a (meth)acryloyl group, a (meth)acryloyloxy group, a vinyl group and an allyl group. In view of good reactivity with another compound having an unsaturated double bond, a (meth)acryloyloxy group is preferred, and an acryloyloxy group is more preferred.

In the polyethylene oxide compound (b), k indicates the repetition number and represents a number of 1 to 50. k is preferably from 5 to 30, more preferably from 7 to 20. When k is 1 or more, the antistatic property is excellent. If k exceeds 50, the film hardness is disadvantageously impaired.

As for the number of the —$(CH_2CH_2O)_k$— structures contained in the polyethylene oxide compound (b), in a comparison by the total number of —$(CH_2CH_2O)_k$— structures contained per molecule, the polyethylene oxide chain is preferably longer in view of the antistatic property, and the number of structures is preferably smaller from the standpoint of enhancing the antistatic property and offering an advantage in balancing the film hardness and the curling behavior and is preferably 6 or less, more preferably 4 or less, still more preferably 1.

Also, from the standpoint of enhancing the antistatic property, the percentage (m2/m1) of the formula weight (m2) of the —$(CH_2CH_2O)_k$— structure occupying in the molecular weight (m1) of the polyethylene oxide compound (b) is preferably from 40 to 90%, more preferably from 50 to 85%, still more preferably from 60 to 83%.

The molecular weight of the polyethylene oxide compound (b) is preferably 2,000 or less, more preferably from 100 to 1,500, still more preferably from 200 to 1,000. When the molecular weight is 2,000 or less, enhancement in the hardness of the antistatic hard coat layer and a high effect of reducing curling are advantageously achieved. This is considered to result because when the molecular weight of the polyethylene oxide compound (b) is 2,000 or less, the polyethylene oxide compound (b) is less likely to gather on the substrate surface.

The polyethylene oxide compound (b) contains a photopolymerizable group and a —$(CH_2CH_2O)_k$— structure and may contain a structure other than these. Examples thereof include an alkylene group, an arylene group, an ether bond, a thioether bond and an ester bond.

The polyethylene oxide compound (b) is preferably composed of a photopolymerizable group and a —$(CH_2CH_2O)_k$— structure, because the antistatic effect is most likely to be developed.

The polyethylene oxide compound (b) may have a branched or linear structure, but when compared between branched and linear structures with the number of ($CH_2CH_2O$) structures contained per molecule being the same, a linear compound has a higher effect of enhancing the antistatic property.

A particularly preferred structure of the polyethylene oxide compound (b) is a structure where a photopolymerizable group is bonded to both ends of one —$(CH_2CH_2O)_k$— structure, and a compound represented by the following formula (b1) is preferred.

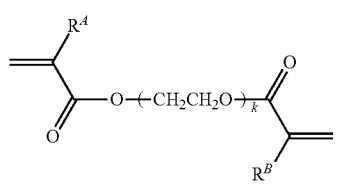

(b1)

In the formula above, each of $R^A$ and $R^B$ independently represents a hydrogen atom or a methyl group. k has the same meaning as above, and its preferred range is also the same. Above all, a compound where k is about 9 is most preferred.

Specific examples of the polyethylene oxide compound (b) are illustrated below, but the present invention is not limited thereto. Here, ethylene oxide is shortened into "EO".

EO-added trimethylolpropane tri(meth)acrylate,
EO-added pentaerythritol tetra(meth)acrylate,
EO-added ditrimethylolpropane tetra(meth)acrylate,
EO-added dipentaerythritol penta(meth)acrylate,
EO-added dipentaerythritol hexa(meth)acrylate,
tris(2-hydroxyethyl)isocyanurate trim(meth)acrylate, and
EO-modified diglycerin tetraacrylate.

The polyethylene oxide compound (b) can be synthesized by the method described, for example, in JP-A-2001-172307 and Japanese Patent 4506237. A commercially available product may be also used as the polyethylene oxide compound (b). Preferred examples of the commercially available product include "NK Ester A-400", "NK Ester ATM-4E" and "NK Ester ATM-35E", produced by Shin-Nakamura Chemical Co., Ltd.; "BLEMMER PDE-50", "BLEMMER AAE-300", "BLEMMER PDE-200", "BLEMMER PDE-1000" and "BLEMMER PME-4000", produced by NOF Corporation; "Viscoat V#360", produced by Osaka Organic Chemical Industry Ltd.; and "DGE-4A", produced by Kyoeisha Chemical Co., Ltd.

From the standpoint that the amount is large enough to impart antistatic property and less likely to impair the film hardness, the content of the polyethylene oxide compound (b) in the antistatic hard coat layer-forming composition of the present invention is preferably from 1 to 30 weight %, more preferably from 3 to 20 weight %, still more preferably from 5 to 15 weight %, based on the entire solid content in the antistatic hard coat layer-forming composition.

[(c) Compound Having an Unsaturated Double Bond]

The (c) compound having an unsaturated double bond, contained in the antistatic hard coat layer-forming composition of the present invention, is described below.

The unsaturated double bond-containing compound (c) can function as a binder and is preferably a polyfunctional monomer having two or more polymerizable unsaturated groups. The polyfunctional monomer having two or more polymerizable unsaturated groups can function as a curing agent and makes it possible to enhance the strength and scratch resistance of the coating film. The number of polymerizable unsaturated groups is more preferably 3 or more.

The unsaturated double bond-containing compound (c) includes a compound having a polymerizable functional group such as (meth)acryloyl group, vinyl group, styryl group and allyl group. Above all, a (meth)acryloyl group and —C(O)OCH=$CH_2$ are preferred. The following compounds having three or more (meth)acryloyl groups per molecule can be preferably used in particular.

Specific examples of the compound having a polymerizable unsaturated bond include (meth)acrylic acid diesters of alkylene glycol, (meth)acrylic acid diesters of polyoxyalkylene glycol, (meth)acrylic acid diesters of polyhydric alcohol, (meth)acrylic acid diesters of ethylene oxide or propylene oxide adduct, epoxy (meth)acrylates, urethane (meth)acrylates, and polyester (meth)acrylates.

Among these, esters of a polyalcohol with a (meth)acrylic acid are preferred. Examples thereof include 1,4-butanediol di(meth)acrylate, 1,6-hexanediol di(meth)acrylate, neopentyl glycol (meth)acrylate, ethylene glycol di(meth)acrylate, triethylene glycol di(meth)acrylate, pentaerythritol tetra (meth)acrylate, pentaerythritol tri(meth)acrylate, trimethylolpropane tri(meth)acrylate, EO-modified trimethylolpropane tri(meth)acrylate, PO-modified trimethylolpropane tri(meth)acrylate, EO-modified phosphoric acid tri(meth)acrylate, trimethylolethane tri(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetramethacrylate, polyurethane polyacrylate, polyester polyacrylate, and caprolactone-modified tris(acryloxyethyl)isocyanurate.

Commercially available (meth)acryloyl group-containing polyfunctional acrylate-based compounds may be also used, and examples thereof include KAYARAD DPHA and KAYARAD PET-30, produced by Nippon Kayaku Co., Ltd.; and NK Ester A-TMMT and NK Ester A-TMPT, produced by Shin-Nakamura Chemical Co., Ltd.

A fluorine-free polyfunctional monomer is described in paragraphs [0114] to [0122] of JP-A-2009-98658, and the same can apply to the present invention.

For giving a sufficiently high rate of polymerization and thereby imparting hardness and the like, the content of the unsaturated double bond-containing compound (c) in the antistatic hard coat layer-forming composition of the present invention is preferably from 40 to 98 weight %, more preferably from 60 to 95 weight %, based on the entire solid content in the antistatic hard coat layer-forming composition.

[(d) Photopolymerization Initiator]

The photopolymerization initiator (d) contained in the antistatic hard coat layer-forming composition of the present invention is described below.

Examples of the photopolymerization initiator include acetophenones, benzoins, benzophenones, phosphine oxides, ketals, anthraquinones, thioxanthones, azo compounds, peroxides, 2,3-dialkyldione compounds, disulfide compounds, fluoroamine compounds, aromatic sulfoniums, lophine dimers, onium salts, borates, active esters, active halogens, inorganic complexes, and coumarins. Specific examples, preferred embodiments and commercial products of the photopolymerization initiator are described in paragraphs [0133] to [0151] of JP-A-2009-098658, and these can be suitably used also in the present invention.

Various examples are described also in *Saishin UV Koka Gijutsu* (*Latest UV Curing Technologies*), page 159, Technical Information Institute Co., Ltd. (1991), and Kiyomi Kato, *Shigaisen Koka System* (*Ultraviolet Curing System*), pp. 65-148, Sogo Gijutsu Center (1989), and these are useful in the present invention.

For the reason of setting the amount to be large enough to polymerize a polymerizable compound contained in the antistatic hard coat layer-forming composition and at the same time, sufficiently small to prevent an excessive increase of initiation sites, the content of the photopolymerization initiator (d) in the antistatic hard coat layer-forming composition of the present invention is preferably from 0.5 to 8 weight %, more preferably from 1 to 5 weight %, based on the entire solid content in the antistatic hard coat layer-forming composition.

In the antistatic hard coat layer-forming composition of the present invention, components other than those described above may be also added.

Those other components are described below.

(Solvent)

The antistatic hard coat layer-forming composition may contain various organic solvents.

In the present invention, from the standpoint of obtaining compatibility with the ion-conducting compound, the composition preferably contains a hydrophilic solvent. The hydrophilic solvent includes, for example, an alcohol-based solvent, a carbonate-based solvent and an ester-based solvent, and examples thereof include methanol, ethanol, isopropanol, n-butyl alcohol, cyclohexyl alcohol, 2-ethyl-1-hexanol, 2-methyl-1-hexanol, 2-methoxyethanol, 2-propoxyethanol, 2-butoxyethanol, diacetone alcohol, dimethyl carbonate, diethyl carbonate, diisopropyl carbonate, methyl ethyl carbonate, methyl n-propyl carbonate, ethyl formate, propyl formate, pentyl formate, methyl acetate, ethyl acetate, propyl acetate, methyl propionate, ethyl propionate, ethyl 2-ethoxypropionate, methyl acetoacetate, ethyl acetoacetate, methyl 2-methoxyacetate, methyl 2-ethoxyacetate, ethyl 2-ethoxyacetate, acetone, 1,2-diacetoxyacetone, and acetylacetone. One of these solvents may be used alone, or two or more thereof may be used in combination.

A solvent other than those described above may be also used. This solvent includes, for example, an ether-based solvent, a ketone-based solvent, an aliphatic hydrocarbon-based solvent, and an aromatic hydrocarbon-based solvent, and examples thereof include dibutyl ether, dimethoxyethane, diethoxyethane, propylene oxide, 1,4-dioxane, 1,3-dioxolane, 1,3,5-trioxane, tetrahydrofuran, anisole, phenetole, methyl ethyl ketone (MEK), diethyl ketone, dipropyl ketone, diisobutyl ketone, cyclopentanone, cyclohexanone, methylcyclohexanone, methyl isobutyl ketone, 2-octanone, 2-pentanone, 2-hexanone, ethylene glycol ethyl ether, ethylene glycol isopropyl ether, ethylene glycol butyl ether, propylene glycol methyl ether, ethyl carbitol, butyl carbitol, hexane, heptane, octane, cyclohexane, methylcyclohexane, ethylcyclohexane, benzene, toluene and xylene. One of these solvents may be used alone, or two or more thereof may be used in combination.

The solvent is preferably used so that the antistatic hard coat layer-forming composition of the present invention can have a solid content concentration of 20 to 80 weight %, more preferably from 30 to 75 weight %, and most preferably from 40 to 70 weight %. (Surfactant)

In the antistatic hard coat layer-forming composition of the present invention, it is also preferred to use various surfactants. In general, the surfactant can sometimes prevent thickness unevenness or the like attributable to uneven drying due to local distribution of drying air or can improve surface unevenness of the antistatic layer or repelling of the coating material. Furthermore, in some cases, the surfactant enhances the dispersibility of an antistatic compound, and this is advantageous in that higher electrical conductivity is more stably developed.

Specifically, the surfactant is preferably a fluorine-containing surfactant or a silicone-containing surfactant. Also, as the surfactant, an oligomer or a polymer is better than a low molecular compound.

When a surfactant is added, the surfactant swiftly moves and is unevenly distributed to the surface of the coated liquid film and after drying of the film, the surfactant remains unevenly distributed on the surface. Therefore, the surface energy of the antistatic layer having added thereto a surfactant is decreased by the surfactant. From the standpoint of preventing film thickness non-uniformity, repelling or unevenness of the antistatic layer, the surface energy of the film is preferably low.

Preferred embodiments and specific examples of the fluorine-containing surfactant are described in paragraphs [0023] to [0080] of JP-A-2007-102206, and the same can apply to the present invention.

Preferred examples of the silicone-based surfactant include those containing a plurality of dimethylsilyloxy units as a repeating unit and having a substituent at the terminal and/or in the side chain of the compound chain. The compound chain containing dimethylsilyloxy as a repeating unit may contain a structural unit other than dimethylsilyloxy. The substituents may be the same or different, and the compound preferably has a plurality of substituents. Preferred examples of the substituent include a group containing a polyether group, an alkyl group, an aryl group, an aryloxy group, a cinnamoyl group, an oxetanyl group, a fluoroalkyl group or a polyoxyalkylene group.

The molecular weight is not particularly limited but is preferably 100,000 or less, more preferably 50,000 or less, still more preferably from 1,000 to 30,000, and the most preferably from 1,000 to 20,000.

Preferred examples of the silicone-based compound include, but are not limited to, "X-22-174DX", "X-22-2426", "X22-164C" and "X-22-176D" (all trade names), produced by Shin-Etsu Chemical Co., Ltd.; "FM-7725", "FM-5521" and "FM-6621" (all trade names), produced by Chisso Corp.; "DMS-U22" and "RMS-033" (both trade names), produced by Gelest; "SH200", "DC11PA", "ST80PA", "L7604", "FZ-2105", "L-7604", "Y-7006" and "SS-2801" (all trade names), produced by Dow Corning Toray Silicone Co., Ltd.; and "TSF400" (trade name), produced by Momentive Performance Materials Inc.

The surfactant is preferably contained in an amount of 0.01 to 0.5 weight %, more preferably from 0.01 to 0.3 weight %, based on the entire solid content of the antistatic hard coat layer-forming coating composition.

(Light-Transmitting Resin Particle)

In the antistatic hard coat layer of the present invention, various light-transmitting resin particles can be used for imparting an antiglare property (surface scattering property) or internal scattering property.

As the variation in the particle diameter of the light-transmitting resin particle is smaller, the variation in the scattering property is smaller and design of the haze value becomes easier. The light-transmitting particle is preferably a plastic bead, and a plastic bead having high transparency and giving the above-described numerical value as a refractive index difference from the binder is more preferred.

As to the organic particle, for example, a polymethyl methacrylate particle (refractive index: 1.49), a crosslinked poly(acryl-styrene) copolymer particle (refractive index: 1.54), a melamine resin particle (refractive index: 1.57), a polycarbonate particle (refractive index: 1.57), a polystyrene particle (refractive index: 1.60), a crosslinked polystyrene particle (refractive index: 1.61), a polyvinyl chloride particle (refractive index: 1.60), and a benzoguanamine-melamine formaldehyde particle (refractive index: 1.68) are used.

Among these, a crosslinked polystyrene particle, a crosslinked poly((meth)acrylate) particle and a crosslinked poly(acryl-styrene) particle are preferably used. The refractive index of the binder is adjusted according to the refractive index of each light-transmitting particle selected from these particles, whereby the internal haze, surface haze and center-line average roughness of the present invention can be achieved.

The refractive index difference between the binder and the light-transmitting resin particle (refractive index of light-transmitting particle—refractive index of binder) which are usable in the present invention is, in terms of the absolute value, preferably from 0.001 to 0.030. The refractive index difference in this range allows for no occurrence of a problem such as film character blurring, reduction in dark-room contrast, or surface clouding.

The average particle diameter (on the volume basis) of the light-transmitting resin particle is preferably from 0.5 to 20 μm. When the average particle diameter is in this range, the light scattering angle distribution is kept from excessively extending to a wide angle and therefore, blurring of characters on the display does not occur.

Two or more kinds of light-transmitting resin particles differing in the particle diameter may be used in combination. A light-transmitting resin particle having a larger particle diameter can impart an antiglare property, and a light-transmitting particle having a smaller particle diameter can reduce the roughened texture on the surface.

In the case of blending the light-transmitting particle, this particle is blended to account for 3 to 30 weight % based on the entire solid content of the antistatic hard coat layer. When the content is in this range, the problem such as blurring of the image or clouding or glaring of the surface can be prevented and the antistatic property is also not impaired.

[Optical Film]

The optical film of the present invention is described below.

The optical film of the present invention has, on a transparent substrate, an antistatic hard coat layer formed using the above-described antistatic hard coat layer-forming composition.

The optical film of the present invention has an antistatic hard coat layer on a transparent substrate, and one functional layer alone or a plurality of functional layers, which are required according to the purpose, may be further provided. For example, an antireflection layer (a layer having an adjusted refractive index, such as low refractive index layer, medium refractive index layer and high refractive index layer) or the like may be provided.

More specific examples of the layer configuration for the optical film of the present invention are shown below:

transparent substrate/antistatic hard coat layer, transparent substrate/antistatic hard coat layer/low refractive index layer, transparent substrate/antistatic hard coat layer/high refractive index layer/low refractive index layer, and transparent substrate/antistatic hard coat layer/medium refractive index layer/high refractive index layer/low refractive index layer.

[Transparent Substrate]

In the optical film of the present invention, various materials can be used as the transparent substrate (support), but a substrate containing a cellulose-based polymer is preferred, and it is more preferred to use a cellulose acylate film.

The cellulose acylate film is not particularly limited, but in the case of disposing it in a display, a cellulose triacetate film can be directly used as a protective film for protecting a polarizing layer of a polarizing plate and therefore, a cellulose triacetate film is particularly preferred in view of productivity and cost.

The thickness of the cellulose acylate film is usually in the order of 25 to 1,000 μm but is preferably from 40 to 200 μm, where good handleability and required substrate strength are obtained.

In the present invention, a cellulose acetate having an acetylation degree of 59.0 to 61.5% is preferably used for the cellulose acylate film. The acetylation degree means the amount of acetic acid bonded per unit weight of cellulose. The acetylation degree is determined according to the measurement and calculation of acetylation degree in ASTM: D-817-91 (Test Method of Cellulose Acetate, etc.). The viscosity average polymerization degree (DP) of the cellulose acylate is preferably 250 or more, more preferably 290 or more.

Also, in the cellulose acylate for use in the present invention, the Mw/Mn (Mw is the weight average molecular weight and Mn is the number average molecular weight) value measured by gel permeation chromatography is preferably close to 1.0, in other words, the molecular weight distribution is preferably narrow. Specifically, the Mw/Mn value is preferably from 1.0 to 1.7, more preferably from 1.3 to 1.65, and the most preferably from 1.4 to 1.6.

In general, the hydroxyl groups at the 2-, 3- and 6-positions of the cellulose acylate are not distributed equally, each ⅓ of the entire substitution degree, but the substitution degree of 6-position hydroxyl group tends to be small. In the present invention, the substitution degree of 6-position hydroxyl group of the cellulose acylate is preferably large as compared with the 2- or 3-position.

The hydroxyl group at the 6-position is preferably substituted with an acyl group in a ratio of 32% or more, more preferably 33% or more, still more preferably 34% or more, based on the entire substitution degree. Furthermore, the substitution degree for the 6-position acyl group of cellulose acylate is preferably 0.88 or more. The 6-position hydroxyl group may be substituted, in addition to the acetyl group, with an acyl group having a carbon number of 3 or more, such as propionyl group, butyroyl group, valeroyl group, benzoyl group and acryloyl group. The substitution degree at each position can be determined by NMR.

In the present invention, a cellulose acetate obtained by methods described in Examples of JP-A-11-5851, that is, Synthesis Example 1 in paragraphs 0043 and 0044, Synthesis Example 2 in paragraphs 0048 and 0049, and Synthesis Example 3 in paragraph 0051 and 0052, can be used as the cellulose acylate.

[Physical Properties of Antistatic Hard Coat Layer]

The refractive index of the antistatic hard coat layer in the present invention is preferably from 1.48 to 1.65, more preferably from 1.48 to 1.60, and most preferably from 1.48 to 1.55. A refractive index in this range is preferred, because interference unevenness with the substrate can be suppressed and when a low refractive index layer is stacked, the reflection hue can be made neutral.

The film thickness of the antistatic hard coat layer is preferably 1 μm or more, more preferably from 3 to 20 μm, still more preferably from 5 to 15 μm, and most preferably from 6 to 15 μm. Within this range, both physical strength and antistatic property can be satisfied.

Also, the strength of the antistatic hard coat layer is, in a pencil hardness test, preferably 2H or more and more preferably 3H or more. Furthermore, in the Taber test in accordance with JIS K5400, the abrasion loss of the specimen between before and after the test is preferably smaller.

The transmittance of the antistatic hard coat layer is preferably 80% or more, more preferably 85% or more, and most preferably 90% or more.

[Physical Properties of Optical Film]

The common logarithmic value (LogSR) of the surface resistivity SR(Ω/sq) of the optical film of the present invention is preferably lower in view of antistatic property and, in an environment at 25° C. and 60%, preferably 12 or less, more preferably from 5 to 11, still more preferably from 6 to 10. By setting the surface resistivity to the range above, an excellent dust-proof performance can be imparted.

(Production Method of Optical Film)

The optical film of the present invention can be formed by the following method, but the present invention is not limited to this method.

An antistatic hard coat layer-forming composition is prepared first. Next, the composition is coated on a transparent support by a dip coating method, an air knife coating method, a curtain coating method, a roller coating method, a wire bar coating method, a gravure coating method, a die coating method or the like, and then heated/dried. A microgravure coating method, a wire bar coating method and a die coating method (see, U.S. Pat. No. 2,681,294 and JP-A-2006-122889) are preferred, and a die coating method is more preferred.

After the coating, the layer formed of the antistatic hard coat layer-forming composition is irradiated with light and thereby cured to form an antistatic layer. If desired, other layers (for example, the later-described layers constituting the film, such as hard coat layer and antiglare layer) may be previously coated on the transparent support, and the antistatic hard coat layer may be formed thereon. In this way, the optical film of the present invention is obtained.

The production method for the optical film of the present invention is preferably a method having a step of coating and curing the antistatic hard coat layer-forming composition on a cellulose acylate film substrate to form an antistatic hard coat layer.

(High Refractive Index Layer and Medium Refractive Index Layer)

The optical film of the present invention may further have a high refractive index layer or a medium refractive index layer.

The refractive index of the high refractive index layer is preferably from 1.65 to 2.20, more preferably from 1.70 to 1.80. The refractive index of the medium refractive index layer is adjusted to a value between the refractive index of the low refractive index layer and the refractive index of the high refractive index layer. The refractive index of the medium refractive index layer is preferably from 1.55 to 1.65, more preferably from 1.58 to 1.63.

As for the method to form the high refractive index layer and the medium refractive index layer, a transparent thin film of inorganic oxide formed by a chemical vapor deposition (CVD) method or a physical vapor deposition (PVD) method, particularly a vacuum deposition method or a sputtering method, which are a kind of physical vapor deposition method, may be used, but a method by all-wet coating is preferred.

The medium refractive index layer and high refractive index layer are not particularly limited as long as they are a layer having a refractive index in the range above, but those known as a constituent component can be used, and specific examples thereof are described in paragraphs [0074] to [0094] of JP-A-2008-262187.

(Low Refractive Index Layer)

The optical film of the present invention preferably has a low refractive index layer on the antistatic hard coat layer, directly or through another layer. In this case, the optical film of the present invention can function as an antireflection film.

The refractive index of the low refractive index layer is preferably from 1.30 to 1.51, more preferably from 1.30 to 1.46, still more preferably 1.32 to 1.38. A reflectance in this range is preferred, because the reflectance can be kept low and the film strength can be maintained. As for the method to form the low refractive index layer, similarly to the above, a transparent thin film of inorganic oxide formed by a chemical vapor deposition (CVD) method or a physical vapor deposition (PVD) method, particularly a vacuum deposition method or a sputtering method, which are a kind of physical vapor deposition method, may be used. Among these, a method by all-wet coating using a composition for low refractive index layer is preferred.

The low refractive index layer is not particularly limited as long as it is a layer having a refractive index in the range above, but those known as a constituent component can be used. Specifically, the composition containing a fluorine-containing curable resin and an inorganic fine particle described in JP-A-2007-298974, and the hollow silica fine particle-containing low refractive index coating described in JP-A-2002-317152, JP-A-2003-202406 and JPA-2003-292831 can be suitably used.

[Protective Film for Polarizing Plate]

In the case of using the optical film as a surface protective film of a polarizing film (polarizing plate protective film), the adhesion to the polarizing film mainly composed of a polyvinyl alcohol can be improved by hydrophilizing the transparent support surface opposite the side having the thin-film layer, that is, the surface on the side to be laminated with the polarizing film.

It is also preferred that out of two protective films of the polarizer, the film other than the optical film is an optically compensatory film having an optically compensatory layer containing an optically anisotropic layer. The optically compensatory film (retardation film) can improve the viewing angle characteristics on the liquid crystal display screen.

A known optically compensatory film may be used but from the standpoint of providing a large viewing angle, the optically compensatory film described in JPA-2001-100042 is preferred.

The saponification treatment is described below. The saponification treatment is a treatment of dipping the optical film in a heated aqueous alkali solution for a fixed time and after water washing, subjecting the film to acid washing for neutralization. The treatment conditions are not limited as long as the transparent support surface on the side laminated with the polarizing film is hydrophilized, and the concentration of processing agent, the temperature of processing solution, and the processing time are appropriately determined, but due to the need to ensure the productivity, the treatment conditions are usually determined to finish the treatment in 3 minutes. As general conditions, the alkali concentration is from 3 to 25 weight %, the treatment temperature is from 30 to 70° C., and the treatment time is from 15 seconds to 5 minutes. The alkali species used for the alkali treatment is suitably sodium hydroxide or potassium hydroxide, the acid used for acid washing is suitably sulfuric acid, and water used for water washing is suitably ion-exchanged water or pure water.

The antistatic layer of the optical film of the present invention can keep its good antistatic performance by such a saponification treatment even when exposed to an aqueous alkali solution.

In the case of using the optical film of the present invention as a surface protective film of a polarizing film (polarizing plate protective film), the cellulose acylate film is preferably a cellulose triacetate film.

[Polarizing Plate]

The polarizing plate of the present invention is described below.

The polarizing plate of the present invention is a polarizing plate having a polarizing film and two protective films for protecting both surfaces of the polarizing film, wherein at least one of the protective films is the optical film or antireflection film of the present invention.

The polarizing film includes an iodine-based polarizing film, a dye-based polarizing film using a dichroic dye, and a polyene-based polarizing film. The iodine-based polarizing film and the dye-based polarizing film can be generally produced using a polyvinyl alcohol-based film.

A configuration where the cellulose acylate film of the optical film adheres to a polarizing film, if desired, through an adhesive layer or the like composed of a polyvinyl alcohol and a protective film is also provided on another side of the polarizing film, is preferred. On another protective film surface opposite the polarizing film, an adhesive layer may be provided.

By using the optical film of the present invention as a polarizing plate protective film, a polarizing plate excellent in the physical strength, antistatic property and durability can be fabricated.

The polarizing plate of the present invention may also have an optically compensating function. In this case, it is preferred that the optical film is used for the formation of only one surface protective film on either front side or back side out of two surface protective films and the surface protective film on the other side of the polarizing plate opposite the side having the optical film is an optically compensatory film.

By producing a polarizing plate where the optical film of the present invention is used for one polarizing plate protective film and an optically compensatory film having optical anisotropy is used for another protective film of the polarizing film, the bright-room contrast and up/down right/left viewing angle of a liquid crystal display device can be more improved.

[Image Display Device]

The image display device of the present invention has the optical film or polarizing plate of the present invention on the outermost surface of the display.

The optical film and polarizing plate of the present invention can be suitably used for an image display device such as liquid crystal display device (LCD), plasma display panel (PDP), electroluminescent display device (ELD) and cathode ray tube display device (CRT).

In particular, the optical film and polarizing plate can be advantageously used in an image display device such as liquid crystal display device and is more preferably used for the outermost surface layer on the backlight side of the liquid crystal cell in a transmissive/transflective liquid crystal display device.

In general, a liquid crystal display device has a liquid crystal cell and two polarizing plates disposed on both sides thereof, and the liquid crystal cell carries a liquid crystal between two electrode substrates. Furthermore, in some cases, one optically anisotropic layer is disposed between the liquid crystal cell and one polarizing plate, or two optically anisotropic layers are provided, that is, one is provided between the liquid crystal cell and one polarizing plate and another is provided between the crystal cell and another polarizing plate.

The liquid crystal cell is preferably of TN mode, VA mode, OCB mode, IPS mode or ECB mode.

EXAMPLES

The present invention is described in greater detail below by referring to Examples, but the scope of the present invention should not be construed as being limited thereto. Unless otherwise indicated, the "parts" and "%" are on a weight basis.

Example 1

[Production of Optical Film]

As described below, a coating solution for forming an antistatic hard coat layer was prepared, and an antistatic hard coat layer was formed on a transparent substrate to produce Optical Film Sample Nos. 1 to 52.

(Synthesis of (a) Ion-Conducting Compound)

Synthesis was performed in the same manner as in Synthesis Examples 1 to 8 of Japanese Patent 4600605 to synthesize corresponding Compounds IP-14 to IP-21 (a 30% ethanol solution) as the ion-conducting compound.

(Preparation of Coating Solution for Antistatic Hard Coat Layer)

Respective components were added to give the composition of Coating Solution A-1 for Antistatic Hard coat Layer shown in Table 1 below, and the obtained composition was charged into a mixing tank and after stirring, filtered through a polypropylene-based filter having a pore size of 0.4 μm to prepare Antistatic Hard coat Layer Coating Solution A-1 (solid content concentration: 50 weight %).

By the same method as in the preparation of Coating Solution A-1 for Antistatic Hard coat Layer, respective components were mixed as shown in Tables 1 and 2 below, and the mixture was dissolved in a solvent and thereby adjusted to give the compositional ratio shown in Tables 1 and 2. In this way, Coating Solutions A-2 to A-52 for Antistatic hard coat Layer having a solid content concentration of 50 weight % were prepared.

TABLE 1

Antistatic Hard coat Layer-Forming Composition

| Optical Film Sample No. | Name of Composition | (a) Ion-Conducting Compound Kind | Content | (b) Polyalkylene Oxide Compound Kind | Content | Molecular Weight | m2/m1 | (c) Polyfunctional Monomer Kind | Content | (d) Irg. 184 Content | Solvent Kind | Remarks |
|---|---|---|---|---|---|---|---|---|---|---|---|---|
| 1 | A-1 | IP-9 | 10% | A-400 | 5% | 538 | 74% | PET30 | 82% | 3% | MEK | Invention |
| 2 | A-2 | IP-9 | 10% | A-400 | 10% | 538 | 74% | PET30 | 77% | 3% | MEK | Invention |
| 3 | A-3 | IP-9 | 10% | A-400 | 15% | 538 | 74% | PET30 | 72% | 3% | MEK | Invention |
| 4 | A-4 | IP-9 | 10% | A-400 | 30% | 538 | 74% | PET30 | 57% | 3% | MEK | Invention |
| 5 | A-5 | IP-9 | 10% | A-400 | 50% | 538 | 74% | PET30 | 37% | 3% | MEK | Invention |
| 6 | A-6 | IP-9 | 10% | | | | | PET30 | 87% | 3% | MEK | Comp. Ex. |
| 7 | A-7 | IP-9 | 20% | | | | | PET30 | 77% | 3% | MEK | Comp. Ex. |
| 8 | A-8 | IP-9 | 5% | | | | | PET30 | 92% | 3% | MEK | Comp. Ex. |
| 9 | A-9 | IP-9 | 10% | PDE-200 | 10% | 330 | 53% | PET30 | 77% | 3% | MEK | Invention |
| 10 | A-10 | IP-9 | 10% | PDE-200 | 30% | 330 | 53% | PET30 | 57% | 3% | MEK | Invention |
| 11 | A-11 | IP-9 | 10% | PDE-1000 | 10% | 1176 | 86% | PET30 | 77% | 3% | MEK | Invention |
| 12 | A-12 | IP-9 | 10% | PDE-1000 | 30% | 1176 | 86% | PET30 | 57% | 3% | MEK | Invention |
| 13 | A-13 | IP-9 | 10% | PME-4000 | 10% | 4046 | 98% | PET30 | 77% | 3% | MEK | Comp. Ex. |
| 14 | A-14 | IP-9 | 10% | V#360 | 10% | 428 | 31% | PET30 | 77% | 3% | MEK | Invention |
| 15 | A-15 | IP-9 | 10% | PDE-50 | 10% | 198 | 22% | PET30 | 77% | 3% | MEK | Invention |
| 16 | A-16 | IP-9 | 10% | AAE-300 | 10% | 390 | 62% | PET30 | 77% | 3% | MEK | Invention |
| 17 | A-17 | IP-9 | 5% | A-400 | 10% | 538 | 74% | PET30 | 82% | 3% | MEK | Invention |
| 18 | A-18 | IP-9 | 5% | A-400 | 15% | 538 | 74% | PET30 | 77% | 3% | MEK | Invention |
| 19 | A-19 | IP-9 | 5% | PDE-1000 | 10% | 330 | 53% | PET30 | 82% | 3% | MEK | Invention |
| 20 | A-20 | IP-9 | 5% | V#360 | 10% | 428 | 31% | PET30 | 82% | 3% | MEK | Invention |
| 21 | A-21 | IP-9 | 5% | HEA | 10% | 116 | 53% | PET30 | 82% | 3% | MEK | Comp. Ex. |
| 22 | A-22 | IP-9 | 5% | A-400 | 10% | 538 | 74% | A-TMMT | 82% | 3% | ethanol | Invention |
| 23 | A-23 | IP-9 | 5% | A-400 | 10% | 538 | 74% | DPHA | 82% | 3% | ethanol | Invention |
| 24 | A-24 | IP-9 | 5% | A-400 | 10% | 538 | 74% | PET30 | 82% | 3% | ethanol | Invention |
| 25 | A-25 | IP-9 | 5% | DGE-4A | 10% | 564 | 31% | PET30 | 82% | 3% | dimethyl carbonate | Invention |
| 26 | A-26 | IP-9 | 5% | ATM-35E | 10% | 538 | 74% | UA-306H/PET30 | 82% | 3% | MEK/methyl acetate | Invention |
| 27 | A-27 | IP-15 | 5% | ATM-35E | 10% | 538 | 74% | UA-306H/PET30 | 82% | 3% | MEK/methyl acetate | Invention |
| 28 | A-28 | IP-18 | 5% | ATM-35E | 10% | 538 | 74% | UA-306H/PET30 | 82% | 3% | MEK/methyl acetate | Invention |
| 29 | A-29 | IP-16 | 5% | ATM-35E | 10% | 538 | 74% | UA-306H/PET30/A-TMMT | 82% | 3% | MEK/methyl acetate | Invention |
| 30 | A-30 | IP-19 | 5% | ATM-35E | 10% | 538 | 74% | UA-306H/PET30/A-TMMT | 82% | 3% | MEK/methyl acetate | Invention |
| 31 | A-31 | IP-17 | 5% | DGE-4A | 10% | 538 | 74% | A-TMMT | 82% | 3% | MEK/methyl acetate | Invention |
| 32 | A-32 | IP-21 | 5% | DGE-4A | 10% | 538 | 74% | A-TMMT | 82% | 3% | MEK/methyl acetate | Invention |
| 33 | A-33 | IP-14 | 5% | ATM-35E | 10% | 538 | 74% | UA-306H/PET30/DPHA | 82% | 3% | methyl acetate | Invention |
| 34 | A-34 | IP-20 | 5% | ATM-35E | 10% | 538 | 74% | UA-306H/PET30/DPHA | 82% | 3% | methyl acetate | Invention |
| 35 | A-35 | IP-15 | 5% | A-400 | 10% | 538 | 81% | UA-306H/PET30 | 82% | 3% | MEK/methyl acetate | Invention |
| 36 | A-36 | IP-18 | 5% | A-400 | 10% | 538 | 81% | UA-306H/PET30 | 82% | 3% | MEK/methyl acetate | Invention |
| 37 | A-37 | IP-15 | 5% | | | | | UA-306H/PET30 | 92% | 3% | MEK/methyl acetate | Comp. Ex. |
| 38 | A-38 | IP-19 | 5% | | | | | UA-306H/PET30/A-TMMT | 92% | 3% | MEK/methyl acetate | Comp. Ex. |
| 39 | A-39 | IP-17 | 5% | | | | | A-TMMT | 92% | 3% | MEK/methyl acetate | Comp. Ex. |
| 40 | A-40 | IP-20 | 5% | | | | | UA-306H/PET30/DPHA | 92% | 3% | methyl acetate | Comp. Ex. |
| 41 | A-41 | IP-18 | 5% | | | | | UA-306H/PET30 | 92% | 3% | MEK/methyl acetate | Comp. Ex |
| 42 | A-42 | DQ-100 | 10% | A-400 | 10% | 538 | 74% | PET30 | 77% | 3% | ethanol | Invention |
| 43 | A-43 | DQ-100 | 10% | DGE-4A | 10% | 564 | 31% | PET30 | 77% | 3% | ethanol | Invention |
| 44 | A-44 | DQ-100 | 10% | | | | | PET30 | 87% | 3% | ethanol | Comp. Ex. |

*1 The numerical value for the content of each component is the ratio (weight %) as the solid content of each component based on the solid content of all components in the coating solution.
*2 m2 is the formula weight of alkylene oxide structure.
*3 In the case of using a plurality of compounds as the polyfunctional monomer (c), the compounds were blended in an equal weight ratio.

TABLE 2

Antistatic Hard coat Layer-Forming Composition

| Optical Film Sample No. | Name of Composition | Antistatic Hard coat Agent Kind | Content | Polyalkylene Oxide Compound Kind | Content | Molecular Weight m1 | m2/m1 * 100 | Other Additives Polyfunctional Monomer Kind | Content | Irg. 184 Content | Solvent Kind | Remarks |
|---|---|---|---|---|---|---|---|---|---|---|---|---|
| 45 | A-45 | LAS-1211 | 89.7% | A-400 | 10% | 538 | 74% | | | 0.3% | MEK | Invention |
| 46 | A-46 | LAS-1211 | 50.0% | A-400 | 10% | 538 | 74% | A-TMMT | 38.5% | 1.5% | MEK | Invention |
| 47 | A-47 | LAS-1211 | 50.0% | A-400 | 10% | 538 | 74% | A-TMMT | 38.5% | 1.5% | dimethyl carbonate | Invention |
| 48 | A-48 | LAS-1211 | 50.0% | | | | | A-TMMT | 49.7% | 0.3% | dimethyl carbonate | Comp. Ex. |
| 49 | A-49 | UV-AS-102 | 89.7% | A-400 | 10% | 538 | 74% | | | 0.3% | dimethyl carbonate | Invention |
| 50 | A-50 | UV-AS-102 | 50.0% | A-400 | 10% | 538 | 74% | A-TMMT | 38.5% | 1.5% | dimethyl carbonate | Invention |
| 51 | A-51 | UV-AS-102 | 50.0% | ATM-35E | 10% | 538 | 81% | UA-306H/PET30 | 38.5% | 1.5% | dimethyl carbonate | Invention |
| 52 | A-52 | UV-AS-102 | 50.0% | | | | | A-TMMT | 48.5% | 1.5% | dimethyl carbonate | Comp. Ex |

*1 The numerical value for the content of each component is the ratio (weight %) as the solid content of each component based on the solid content of all components in the coating solution.
*2 m2 is the formula weight of alkylene oxide structure.
*3 In the case of using a plurality of compounds as the polyfunctional monomer (c), the compounds were blended in an equal weight ratio.

The compounds used are as follows.
IP-9: Ion-Conducting Compound IP-9
PET30: A mixture of pentaerythritol tetraacrylate and pentaerythritol triacrylate (produced by Nippon Kayaku Co., Ltd.)
Irg.184: A photopolymerization initiator, Irgacure 184 (produced by Ciba Japan K.K.)
DPHA: A mixture of dipentaerythritol pentaacrylate and dipentaerythritol hexaacrylate mixture (produced by Nippon Kayaku Co., Ltd.)
A-TMMT: Pentaerythritol tetraacrylate (NK Ester, produced by Shin-Nakamura Chemical Co., Ltd.)
Light-Ester DQ-100: A quaternary ammonium salt-based compound; containing a polyfunctional monomer; a photopolymerization initiator-containing hard coat agent (produced by Kyoeisha Chemical Co., Ltd.)
LIODURAS LAS-1211: A quaternary ammonium salt-based compound; containing a polyfunctional monomer; a photopolymerization initiator-containing hard coat agent (produced by Toyo Ink Co., Ltd.)
SHIKO UV-AS-102: A quaternary ammonium salt-based compound; containing a polyfunctional monomer; a photopolymerization initiator-containing hard coat agent (produced by Nippon Gosei Kayaku K.K.)
UA-306H: A pentaerythritol triacrylate hexamethylene diisocyanate urethane prepolymer (produced by Kyoeisha Chemical Co., Ltd.)

(Production of Antistatic Hard Coat Layer)

On a cellulose triacetate film (TDH60UF, produced by Fujifilm Corp., refractive index: 1.48) having a thickness of 60 μm as a transparent support, Coating Solution A-1 for Antistatic Hard coat Layer was coated using a gravure coater and dried at 60° C. for about 2 minutes. Thereafter, the coated layer was cured through irradiation with an ultraviolet ray at an illuminance of 400 mW/cm$^2$ and an irradiation dose of 150 mJ/cm$^2$ by using an air-cooled metal halide lamp (manufactured by Eye Graphics Co., Ltd.) of 160 W/cm while purging the system with nitrogen to give an atmosphere having an oxygen concentration of 1.0 vol % or less, whereby Antistatic Hard coat Layer A-1 having a thickness of 12 μm was formed. In this way, Optical Film Sample No. 1 was produced.

Antistatic Hard coat Layers A-2 to A-52 were formed in the same manner by using Coating Solutions A-2 to A-52 for Antistatic Hard coat Layer to produce Optical Film Sample Nos. 2 to 52.

(Evaluation of Optical Film)

Various characteristics of the optical film were evaluated by the following methods. The results are shown in Table 4.

(1) Measurement of Surface Resistance Value

The sample was left standing under the conditions of 20° C. and 15% RH for 2 hours and then measured using a superinsulation resistance/microammeter, TR8601 (manufactured by Advantest Corp.), and the surface resistance value is shown by its common logarithm (log SR). A lower log SR

TABLE 3

| Abbreviation | Product Name | Manufacturer | Structural Formula |
|---|---|---|---|
| A-400 | NK Ester A-400 | Shin-Nakamura Chemical | $CH_2=CHCOO-(C_2H_4O)_9-COCH=CH_2$ |
| PDE-200 | BLEMMER PDE-200 | NOF | $CH_2=C(CH_3)COO-(C_2H_4O)_4-COC(CH_3)=CH_2$ |
| PDE-1000 | BLEMMER PDE-1000 | NOF | $CH_2=C(CH_3)COO-(C_2H_4O)_{23}-COC(CH_3)=CH_2$ |
| PME-4000 | BLEMMER PME-4000 | NOF | $CH_2=C(CH_3)COO-(C_2H_4O)_{90}-H$ |
| V#360 | Viscoat V#360 | Osaka Organic Chemical Industry | $(CH_2=CHCOO-(C_2H_4O)-CH_2)_3-C-C_2H_5$ |
| PDE-50 | BLEMMER PDE-50 | NOF | $CH_2=C(CH_3)COO-(C_2H_4O)-COC(CH_3)=CH_2$ |
| DGE-4A | Light-Ester DGE-4A | Kyoeisha Chemical | $((CH_2=CHCOO-(C_2H_4O))_2-CHCH_2)_4-C$ |
| HEA | HEA | Osaka Organic Chemical Industry | $CH_2=CHCOO-CH_2CH_2-OH$ |
| ATM-35E | NK Ester ATM-35E | Shin-Nakamura Chemical | $(CH_2=CHCOO-(OC_2H_4)_{11-14}-OCH_2)_4-C$ *11 + 12 + 13 + 14 = 35 |
| AAE-300 | BLEMMER AAE-300 | NOF | $CH_2=CH-COO-(C_2H_4O)_{5.5}-Ph$ | indicates a better antistatic property and in the present invention, the value is preferably less than 11.0.

(2) Dust Protection

The transparent support side of the optical film was laminated on an LCD surface, and the device was used for 24 hours in a room having from 100 to 2,000,000 dusts and tissue paper scraps of 0.5 μm or more per 1 ft$^3$ (cubic feet) under conditions of 22° C. and 43% RH. The number of dusts and tissue paper scraps attached per 100 cm$^2$ of the antireflection film was measured, and the sample was evaluated as follows by the average value of the results.

A: The number of dusts was less than 20 and dusts were substantially not attached.

B: The number of dusts was from 20 to less than 200, and a small amount of dusts were attached but this was no problem.

C: The number of dusts was 200 or more, and a large amount of dusts were attached.

(3) Evaluation of Pencil Hardness

The evaluation of pencil hardness described in JIS K 5400 was performed. The optical film was moisture-conditioned at a temperature of 25° C. and a humidity of 60% RH for 2 hours and then evaluated by using pencils for test specified in JIS S 6006. In the present invention, the pencil hardness is preferably 2H or more.

TABLE 4

| Optical Film Sample No. | Performance | | | Remarks |
|---|---|---|---|---|
| | Surface Resistance logSR | Dust Protection | Pencil Hardness | |
| 1 | 9.8 | A | 3.3H | Invention |
| 2 | 9.0 | A | 3.3H | Invention |
| 3 | 8.8 | A | 3.0H | Invention |
| 4 | 8.7 | A | 2.8H | Invention |
| 5 | 8.7 | A | 2.3H | Invention |
| 6 | 11.0 | B | 3.5H | Comp. Ex. |
| 7 | 9.0 | A | 1.8H | Comp. Ex. |
| 8 | 13.0 | C | 4.0H | Comp. Ex. |
| 9 | 9.1 | A | 3.5H | Invention |
| 10 | 8.7 | A | 2.8H | Invention |
| 11 | 8.9 | A | 2.5H | Invention |
| 12 | 8.8 | A | 2.3H | Invention |
| 13 | 8.9 | A | 1.5H | Comp. Ex. |
| 14 | 10.2 | A | 3.5H | Invention |
| 15 | 10.5 | A | 3.0H | Invention |
| 16 | 9.1 | A | 3.0H | Invention |
| 17 | 9.2 | A | 4.0H | Invention |
| 18 | 9.0 | A | 3.8H | Invention |
| 19 | 9.0 | A | 3.8H | Invention |
| 20 | 10.0 | A | 3.5H | Invention |
| 21 | 13.5 | C | 2.8H | Comp. Ex. |
| 22 | 8.6 | A | 3.8H | Invention |
| 23 | 9.0 | A | 4.0H | Invention |
| 24 | 9.3 | A | 3.3H | Invention |
| 25 | 9.5 | A | 3.0H | Invention |
| 26 | 9.2 | A | 3.5H | Invention |
| 27 | 9.0 | A | 3.5H | Invention |
| 28 | 9.0 | A | 3.5H | Invention |
| 29 | 8.9 | A | 3.8H | Invention |
| 30 | 8.9 | A | 3.8H | Invention |
| 31 | 9.3 | A | 4.0H | Invention |
| 32 | 9.3 | A | 4.0H | Invention |
| 33 | 9.4 | A | 4.0H | Invention |
| 34 | 9.4 | A | 4.0H | Invention |
| 35 | 9.1 | A | 3.3H | Invention |
| 36 | 9.1 | A | 3.3H | Invention |
| 37 | 11.0 | B | 3.5H | Comp. Ex. |
| 38 | 11.0 | B | 3.8H | Comp. Ex. |
| 39 | 11.0 | B | 4.0H | Comp. Ex. |
| 40 | 11.0 | B | 4.0H | Comp. Ex. |
| 41 | 11.0 | B | 3.5H | Comp. Ex. |
| 42 | 9.5 | A | 3.5H | Invention |

TABLE 4-continued

| Optical Film Sample No. | Performance | | | Remarks |
|---|---|---|---|---|
| | Surface Resistance logSR | Dust Protection | Pencil Hardness | |
| 43 | 10.0 | A | 3.5H | Invention |
| 44 | 12.5 | C | 4.0H | Comp. Ex. |
| 45 | 8.3 | A | 3.8H | Invention |
| 46 | 8.6 | A | 3.8H | Invention |
| 47 | 8.5 | A | 3.8H | Invention |
| 48 | 11.5 | B | 3.5H | Comp. Ex. |
| 49 | 8.8 | A | 4.0H | Invention |
| 50 | 9.0 | A | 4.0H | Invention |
| 51 | 9.0 | A | 4.2H | Invention |
| 52 | 11.5 | B | 4.0H | Comp. Ex. |

As seen from Table 4, the optical film having an antistatic hard coat layer formed using the antistatic hard coat layer-forming composition of the present invention exhibited low surface resistance and good antistatic property. Also, the optical film having the antistatic hard coat layer of the present invention was excellent in dust protection and film hardness.

Particularly, in the case of using IP-14 to IP-21 as the ion-conducting compound (a), the surface resistance was low, and in the case of using ATM-35E as the polyalkylene oxide compound (b), the pencil hardness was excellent.

In optical films of all Examples, compared with the corresponding optical films of Comparative Examples where the polyalkylene oxide compound (b) was not blended, the surface resistance was low, and excellent dust protection was exhibited. Furthermore, with respect to Examples 26 to 36, even when the amount of the ion-conducting compound (a) was varied between 1% and 30%, the same effects were obtained as compared with the corresponding optical films where the polyalkylene oxide compound (b) was not blended.

Also, in optical films of all Examples, even when Irgacure 907, Irgacure 127, Irgacure 819, Irgacure 754, Darocure TPO (all produced by BASF), or Esacure One (produced by DKSH) was used as the initiator in place of Irgacure 184, or even when the initiators above were mixed in an arbitrary ratio and used, the same effects as in Examples of the invention were obtained.

In optical films of all Examples, even when the thickness of the antistatic hard coat layer was changed in the range of 2 to 20 μm, the same effects as in Examples of the invention were obtained.

In addition, in optical films of all Examples, even when a cellulose triacetate film having a thickness of 80 μm (TDH80UF) or a cellulose triacetate film having a thickness of 40 μm (T40UZ) (both produced by Fujifilm Corp., refractive index: 1.48) was used as the transparent support in place of the cellulose triacetate film having a thickness of 60 μm, the same effects as in Examples of the invention were obtained.

[Production of Antireflection Film]
(Synthesis of Perfluoroolefin Copolymer P-1)

Perfluoroolefin Copolymer P-1 was prepared by the same method as in the synthesis of Perfluoroolefin Copolymer (1) described in JP-A-2010-152311. The refractive index of the obtained polymer was 1.422.

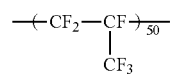

Perfluoroolefin Copolymer (P-1)

-continued

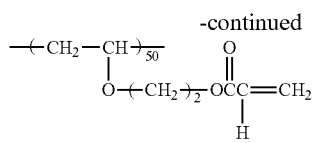

M.W.: 50000

In the structural formula above, 50:50 indicates the molar ratio.

(Preparation of Hollow Silica Liquid Dispersion A-1)

Hollow Silica Liquid Dispersion A-1 (solid content concentration: 18.2 weight %) where the average particle diameter was 60 nm, the shell thickness was 10 nm and the refractive index of silica particle was 1.31, was prepared by the same method as in the preparation of Liquid Dispersion A-1 described in JP-A-2007-298974.

(Preparation of Low Refractive Index Layer-Forming Composition A-1)

The following composition was charged into a mixing tank and stirred to prepare Low Refractive Index Layer-Forming Composition A-1 (solid content concentration: 5 weight %).

| | |
|---|---|
| Perfluoroolefin Copolymer P-1 | 14.8 parts by weight |
| Ethyl methyl ketone | 157.7 parts by weight |
| DPHA | 3.0 parts by weight |
| Hollow Silica Particle Liquid Dispersion A-1 | 21.2 parts by weight |
| Irgacure 127 | 1.3 parts by weight |
| X22-164C | 2.1 parts by weight |

The compounds used were as follows.

DPHA: A mixture of dipentaerythritol pentaacrylate and dipentaerythritol hexaacrylate (produced by Nippon Kayaku Co., Ltd.)

X22-164C: Reactive silicone (produced by Shin-Etsu Chemical Co., Ltd.)

Irgacure 127: Photopolymerization initiator (produced by Ciba Japan)

(Production of Low Refractive Index Layer)

Low Refractive Index Layer-Forming Composition A-1 was coated using a gravure coater on the hard coat layer of Optical Film Sample No. 2 having a hard coat layer produced above to obtain Antireflection Film Sample No. 53. The drying conditions were 90° C. and for 30 seconds, and the ultraviolet curing conditions were such that an air-cooled metal halide lamp (manufactured by Eye Graphics Co., Ltd.) of 240 W/cm was used at an illuminance of 600 mW/cm² and an irradiation dose of 600 mJ/cm² while purging the system with nitrogen to give an atmosphere having an oxygen concentration of 0.1 vol % or less. The film thickness of the low refractive index layer was set to 95 nm.

Out of the optical film samples having a hard coat layer produced above, on the hard coat layers shown in Table 5, Low Refractive Index Layer-Forming Composition A-1 was also coated in the same way to obtain Antireflection Film Sample Nos. 54 to 60.

TABLE 5

| Antireflection Film Sample No. | Optical Film Sample No. |
|---|---|
| 53 | 2 |
| 54 | 46 |
| 55 | 50 |
| 56 | 26 |
| 57 | 30 |

TABLE 5-continued

| Antireflection Film Sample No. | Optical Film Sample No. |
|---|---|
| 58 | 34 |
| 59 | 38 |
| 60 | 40 |

With respect to the obtained Antireflection Film Sample Nos. 53 to 60, the dust protection and pencil hardness were evaluated in the same manner as above. Also, the mirror reflectivity was evaluated by the following method. The results are shown in Table 6.

(4) Mirror Reflectivity

After attaching Adapter ARV-474 to Spectrophotometer V-550 (manufactured by JASCO Corp.), the mirror reflectivity for the outgoing angle of 5° at an incident angle of 5° was measured in the wavelength region of 380 to 780 nm, and the average reflectivity at 450 to 650 nm was measured and used for evaluating the antireflection property.

TABLE 6

| | Evaluation Results | | | |
|---|---|---|---|---|
| Optical Film Sample No. | Mirror Reflectivity | Dust Protection | Pencil Hardness | Remarks |
| 2 | 4.12% | A | 3.3H | Invention |
| 46 | 4.10% | A | 3.8H | Invention |
| 50 | 4.10% | A | 4.0H | Invention |
| 26 | 4.10% | A | 3.5H | Invention |
| 30 | 4.10% | A | 3.8H | Invention |
| 34 | 4.10% | A | 4.0H | Invention |
| 38 | 4.10% | B | 3.8H | Comp. Ex. |
| 40 | 4.10% | B | 4.0H | Comp. Ex. |
| 53 | 1.20% | A | 3.3H | Invention |
| 54 | 1.22% | A | 3.8H | Invention |
| 55 | 1.22% | A | 4.0H | Invention |
| 56 | 1.20% | A | 3.5H | Invention |
| 57 | 1.22% | A | 3.8H | Invention |
| 58 | 1.22% | A | 4.0H | Invention |
| 59 | 1.22% | B | 3.8H | Comp. Ex. |
| 60 | 1.22% | B | 4.0H | Comp. Ex. |

As seen from Table 6, in the case of Sample Nos. 53 to 60 where an antireflection layer was formed on the hard coat layer of the present invention, the mirror reflectivity was reduced to near 1.20% and good antireflection property was able to be imparted. It is also seen that the same good antistatic property (dust protection) and pencil hardness as in the case of not forming an antireflection layer were achieved. Furthermore, even when in place of the sample of Table 5, the optical film in any of Examples was used as the optical film having a hard coat layer on which a low refractive index layer is formed, the same results were obtained.

(Saponification Treatment of Optical Film)

Sample No. 53 was subjected to the following treatment. An aqueous 1.5 mol/liter sodium hydroxide solution was prepared and kept at 55° C. An aqueous 0.01 mol/liter dilute sulfuric acid solution was prepared and kept at 35° C. The produced optical film was dipped in the aqueous sodium hydroxide solution above for 2 minutes and then dipped in water, thereby thoroughly washing away the aqueous sodium hydroxide solution. Subsequently, the sample was dipped in the aqueous dilute sulfuric acid solution above for one minute and then dipped in water, thereby thoroughly washing away the aqueous dilute sulfuric acid solution. Finally, the sample was sufficiently dried at 120° C.

In this way, a saponified optical film was produced.

(Production of Polarizing Plate)

A 80 μm-thick triacetyl cellulose film (TAC-TD80U, produced by Fujifilm Corp.) which had been dipped in an aqueous 1.5 mol/liter NaOH solution at 55° C. for 2 minutes, neutralized and then washed with water, and the saponified optical film were adhered to and thereby caused to protect both surfaces of a polarizer prepared by adsorbing iodine to polyvinyl alcohol and stretching it. In this way, a polarizing plate (Sample No. 61) was produced.

(Production of Circular Polarizing Plate)

A λ/4 plate was laminated to the polarizing plate sample surface on the side opposite the low refractive index layer by using a pressure-sensitive adhesive to produce a circular polarizing plate (Sample No. 62), and Sample No. 62 was laminated to the surface of an organic EL display with a pressure-sensitive adhesive by arranging the low refractive index layer to face outward. As a result, scratching or surface unevenness was not caused, dusts were hardly attached, and a good display performance was obtained.

Sample No. 61 was used as a polarizing plate on the surface of each of a reflective liquid crystal display and a transflective liquid crystal display by arranging the low refractive index layer to face outward. As a result, scratching or surface unevenness was not caused, dusts were hardly attached, and a good display performance was obtained.

Example 2

(Preparation of Coating Solution for Low Refractive Index Layer)
(Synthesis of Fluorine-Containing Polymer a Having an Ethylenically Unsaturated Group (Methacryl-modified Fluoropolymer))

First, a fluorine-containing polymer having a hydroxyl group was synthesized. A stainless steel-made autoclave with an electromagnetic stirrer having an inner volume of 2.0 liters was thoroughly purged using a nitrogen gas and then charged with 400 g of ethyl acetate, 53.2 g of perfluoro(propyl vinyl ether), 36.1 g of ethyl vinyl ether, 44.0 g of hydroxyethyl vinyl ether, 1.00 g of lauroyl peroxide, 6.0 g of an azo group-containing polydimethylsiloxane represented by the following formula (7) (VPS1001 (trade name), produced by Wako Pure Chemical Industries, Ltd.), and 20.0 g of a nonionic reactive emulsifier (NE-30 (trade name), produced by Asahi Denka Co., Ltd.), and after cooling to −50° C. with dry ice-methanol, oxygen in the system was again removed using a nitrogen gas.

Subsequently, 120.0 g of hexafluoropropylene was charged, and temperature elevation was started. The pressure when the temperature in the autoclave reached 60° C. was $5.3 \times 10^5$ Pa. The reaction was allowed to continue under stirring at 70° C. for 20 hours, and when the pressure was reduced to $1.7 \times 10^5$ Pa, the autoclave was cooled with water, thereby stopping the reaction. After reaching room temperature, the unreacted monomer was expelled, the autoclave was opened, and a polymer solution having a solid content concentration of 26.4% was obtained. The obtained polymer solution was poured in methanol to precipitate the polymer, and this polymer was washed with methanol and vacuum-dried at 50° C. to obtain 220 g of a fluorine-containing polymer having a hydroxyl group. This is designated as a hydroxyl group-containing fluorine-containing polymer. The monomers and solvent used are shown in Table 7.

TABLE 7

|  | Amount Charged (g) |
|---|---|
| Monomer | |
| Hexafluoropropylene | 120 |
| Perfluoro(propyl vinyl ether) | 53 |
| Ethyl vinyl ether | 36 |
| Hydroxyethyl vinyl ether | 44 |
| Lauroyl peroxide | 1 |
| VPS1001 | 6 |
| NE-30 | 20 |
| Solvent | |
| Ethyl acetate | 400 |

The obtained hydroxyl group-containing fluorine-containing polymer was measured for the number average molecular weight in terms of polystyrene by gel permeation chromatography. Also, from the NMR analysis results of both $^1$H-NMR and $^{13}$C-NMR and the elemental analysis results, the proportion of each monomer constituting the hydroxyl group-containing fluorine-containing polymer was determined. The results are shown in Table 8.

TABLE 8

|  |  | Compositional Proportion |
|---|---|---|
| Monomer | Hexafluoropropylene | 41 |
|  | Perfluoro(propyl vinyl ether) | 10 |
|  | Ethyl vinyl ether | 21 |
|  | Hydroxyethyl vinyl ether | 24.8 |
|  | NE-30 | 0.8 |
| Polydimethylsiloxane skeleton |  | 2.4 |
| Number average molecular weight |  | 34000 |

NE-30 is a nonionic reactive emulsifier represented by the following formula (10) where n is 9, m is 1 and u is 30.

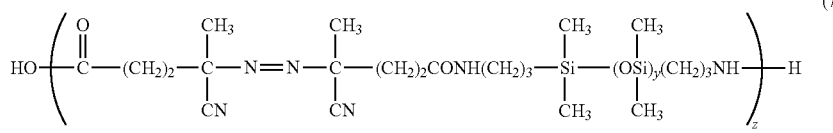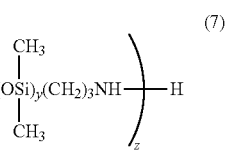

(7)

y represents a number of 1 to 200, and z represents a number of 1 to 20.

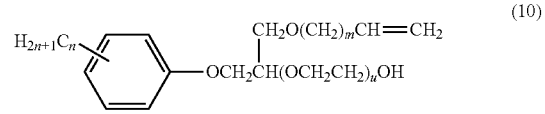

(10)

Next, Ethylenically Unsaturated Group-Containing Fluoropolymer A was synthesized using the obtained hydroxyl group-containing fluorine-containing polymer. A separable flask having a volume of 1 liter and equipped with an electromagnetic stirrer, a glass-made condenser tube and a thermometer was charged with 50.0 g of the hydroxyl group-containing fluorine-containing polymer obtained, 0.01 g of 2,6-di-tert-butyl methyl phenol as a polymerization inhibitor, and 370 g of methyl isobutyl ketone (MIBK), and stirring was performed at 20° C. until the hydroxyl group-containing fluorine-containing polymer was dissolved in MIBK to make a transparent and uniform solution.

Subsequently, 15.1 g of 2-methacryloyloxyethyl isocyanate was added to the system and after stirring until the solution became uniform, 0.1 g of dibutyltin dilaurate was added to start the reaction. Stirring was continued for 5 hours while keeping the temperature of the system at 55 to 65° C., whereby an MIBK solution of Fluorine-Containing Polymer A having an ethylenically unsaturated group was obtained.

Thereafter, 2 g of the obtained solution was weighed into an aluminum dish and dried for 5 minutes on a hot plate at 150° C., and the solid content was determined by weighing the residue and found to be 15.2 weight %. The compounds and solvent used and the solid content are shown in Table 9.

TABLE 9

|  | Amount Charged (g) |
|---|---|
| Hydroxyl group-containing fluorine-containing polymer (a) | 50 |
| 2-Methacryloyloxyethyl isocyanate (b) | 15 |
| 2,6-Di-tert-butyl methyl phenol | 0.01 |
| Dibutyltin dilaurate | 0.1 |
| Methyl isobutyl ketone | 370 |
| Amount charged (molar ratio) of (b) based on the hydroxyl group content of (a) | 1.1 |
| Solid content (wt %) | 15.2 |

[Preparation of Particle Having Void in the Inside]
(Preparation of Liquid Dispersion B-1)

A silica fine particle having a void in the inside was produced by changing the conditions at the preparation in Preparation Example 4 of JP-A-2002-79616. In the final step, solvent replacement with methanol from the state of a liquid dispersion in water was performed to make a 20% silica liquid dispersion and thereby obtain a particle where the average particle diameter was 50 nm, the shell thickness was about 7 nm and the refractive index of silica particle was 1.30. This liquid dispersion was designated as Liquid Dispersion (AA-1).

Parts of acryloyloxypropyltrimethoxysilane and 1.5 parts of diisopropoxyaluminum ethyl acetate were added to 500 parts of Liquid Dispersion (AA-1) and mixed and thereafter, 9 parts of ion-exchanged water was added. The reaction was allowed to proceed at 60° C. for 8 hours and after cooling the reaction solution to room temperature, 1.8 parts of acetylacetone was added. The solvent was replaced by distillation under reduced pressure while adding MEK to keep the total liquid amount almost constant. The replacement was adjusted to finally have a solid content of 20%. In this way, Liquid Dispersion B-1 was prepared.

(Preparation of Liquid Dispersion B-2)

A silica fine particle having a void in the inside was produced by changing the conditions at the preparation in Preparation Example 4 of JP-A-2002-79616. In the final step, solvent replacement with methanol from the state of a liquid dispersion in water was performed to make a 20% silica liquid dispersion and thereby obtain a particle where the average particle diameter was 60 nm, the shell thickness was about 7 nm and the refractive index of silica particle was 1.25. This liquid dispersion was designated as Liquid Dispersion (AA-2).

20 Parts of acryloyloxypropyltrimethoxysilane and 1.5 parts of diisopropoxyaluminum ethyl acetate were added to 500 parts of Liquid Dispersion (AA-2) and mixed and thereafter, 9 parts of ion-exchanged water was added. The reaction was allowed to proceed at 60° C. for 8 hours and after cooling the reaction solution to room temperature, 1.8 parts of acetylacetone was added. The solvent was replaced by distillation under reduced pressure while adding MEK to keep the total liquid amount almost constant. The replacement was adjusted to finally have a solid content of 20%. In this way, Liquid Dispersion B-2 was prepared.

(Preparation of Coating Solution for Low Refractive Index Layer)

Respective components were mixed as shown in Table 10 below, and propylene glycol monomethyl ether acetate was added to account for 20 weight % in all solvents. Thereafter, the mixture was diluted with methyl ethyl ketone to finally have a solid content concentration of 5 weight % and charged into a glass-made separable flask with a stirrer. After stirring at room temperature for 1 hour, the reaction solution was filtered through a polypropylene-made depth filter having a pore size of 0.5 μm to obtain each coating solution for low refractive index layer.

TABLE 10

| | Low Refractive Index Layer-Forming Composition | | | | | | | | | | |
|---|---|---|---|---|---|---|---|---|---|---|---|
| | Fluorine-Containing Polymer | | Fluorine-Containing Monomer | | Fluorine-Free Monomer | | Initiator | | Inorganic Fine Particle | | Silicone Compound | |
| Name of Composition | Kind | Content | Kind | Content | Kind | Content | Kind | Content | Kind | Content | Kind | Content |
| Ln-1 | A | 24% | F-1 | 15% | PET30 | 5% | Irg. 127 | 3% | B-1 | 50% | SI-1/SI-2/SI-3 | 1.5%/0.5%/1% |
| Ln-2 | A | 24% | F-2 | 15% | PET30 | 5% | Irg. 127 | 3% | B-1 | 50% | SI-1/SI-2/SI-3 | 1.5%/0.5%/1% |
| Ln-3 | A | 24% | F-3 | 15% | PET30 | 5% | Irg. 127 | 3% | B-1 | 50% | SI-1/SI-2/SI-3 | 1.5%/0.5%/1% |
| Ln-4 | A | 24% | F-1 | 15% | PET30 | 5% | Irg. 127 | 3% | B-2 | 50% | SI-1/SI-2/SI-3 | 1.5%/0.5%/1% |
| Ln-5 | A | 34% | F-1 | 30% | PET30 | 10% | Irg. 127 | 3% | B-2 | 20% | SI-1/SI-2/SI-3 | 1.5%/0.5%/1% |
| Ln-6 | A | 0% | F-3 | 64% | PET30 | 0% | Irg. 127 | 3% | B-2 | 30% | SI-1/SI-2/SI-3 | 1.5%/0.5%/1% |
| Ln-7 | A | 0% | F-3 | 44% | PET30 | 0% | Irg. 127 | 3% | B-2 | 50% | SI-1/SI-2/SI-3 | 1.5%/0.5%/1% |
| Ln-8 | A | 29% | F-3 | 20% | PET30 | 10% | Irg. 127 | 3% | B-2 | 35% | SI-1/SI-2/SI-3 | 1.5%/0.5%/1% |
| Ln-9 | A | 14% | F-1/F-2 | 25%/10% | PET30 | 10% | Irg. 127 | 3% | B-2 | 35% | SI-1/SI-2/SI-3 | 1.5%/0.5%/1% |
| Ln-10 | A | 14% | F-1/F-2 | 10%/25% | PET30 | 10% | Irg. 127 | 3% | B-2 | 35% | SI-1/SI-2/SI-3 | 1.5%/0.5%/1% |
| Ln-11 | A | 24% | F-1 | 15% | PET30 | 5% | Irg. 127 | 3% | B-2/B-3 | 45%/5% | SI-1/SI-2/SI-3 | 1.5%/0.5%/1% |
| Ln-12 | A | 24% | F-1 | 15% | PET30 | 5% | Irg. 127 | 3% | B-2/B-3 | 40%/10% | SI-1/SI-2/SI-3 | 1.5%/0.5%/1% |
| Ln-13 | A | 14% | F-1/F-2 | 20%/10% | PET30 | 10% | Irg. 127 | 3% | B-2/B-3 | 35%/5% | SI-1/SI-2/SI-3 | 1.5%/0.5%/1% |

TABLE 10-continued

Low Refractive Index Layer-Forming Composition

| Name of Composition | Fluorine-Containing Polymer | | Fluorine-Containing Monomer | | Fluorine-Free Monomer | | Initiator | | Inorganic Fine Particle | | Silicone Compound | |
|---|---|---|---|---|---|---|---|---|---|---|---|---|
| | Kind | Content | Kind | Content | Kind | Content | Kind | Content | Kind | Content | Kind | Content |
| Ln-14 | A | 14% | F-1/F-2 | 10%/20% | PET30 | 10% | Irg. 127 | 3% | B-2/B-3 | 35%/5% | SI-1/SI-2/SI-3 | 1.5%/0.5%/1% |
| Ln-15 | A | 0% | F-2 | 44% | PET30 | 0% | Irg. 127 | 3% | B-2/B-3 | 45%/5% | SI-1/SI-2/SI-3 | 1.5%/0.5%/1% |
| Ln-16 | A | 0% | F-2 | 44% | PET30 | 0% | Irg. 127 | 3% | B-2/B-3 | 40%/10% | SI-1/SI-2/SI-3 | 1.5%/0.5%/1% |

The compounds used are described below.

B-3: MEK-ST-L, produced by Nissan Chemicals Industries, Ltd., colloidal silica (average particle size: about 50 nm).

SI-1: Rad 2600, produced by Tego, number average molecular weight: 16,000; containing a structural unit represented by the following formula (17) and a structural unit represented by the following formula (18), and having 6 structural units represented by the following formula (18).

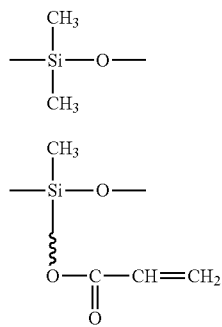

SI-2: Rad 2500, produced by Tego, number average molecular weight: 1,500; containing a structural unit represented by formula (17) and a structural unit represented by formula (18), and having 2 structural units represented by formula (18).

PET-30: mixture of pentaerythritol triacrylate and pentaerythritol tetraacrylate, produced by Nippon Kayaku Co., Ltd.

F-1: Triacryloyl-heptadecafluoro-nonenyl pentaerythritol (the following formula 19).

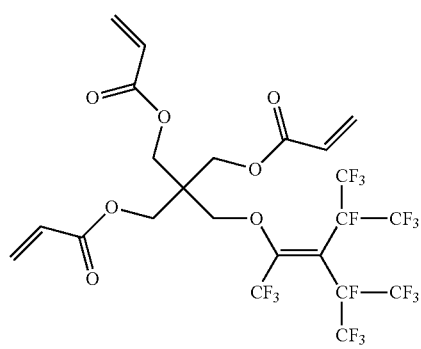

F-2: Fluorine-containing acrylate compound M-1 described in JP-A-2006-284761.

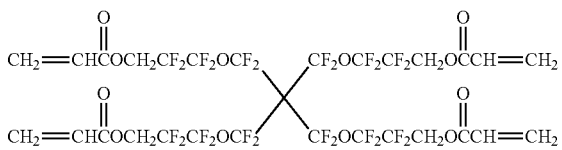

F-3: Fluorine-containing acrylate compound M-9 described in JP-A-2006-284761.

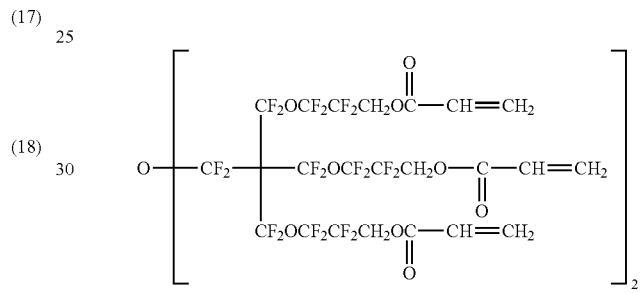

IRGACURE 127: compound represented by the following formula (16), produced by Ciba Specialty Chemicals Corp.

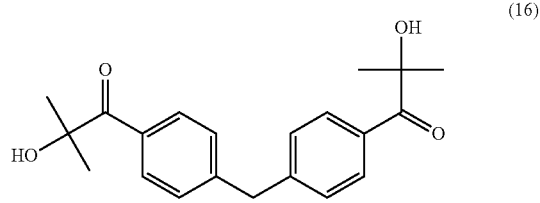 [SMILES: CC(C)(O)C(=O)c1ccc(Cc2ccc(C(=O)C(C)(C)O)cc2)cc1]

SI-3: SILAPLANE FM-0725, silicone compound represented by the following formula (24), produced by Chisso Corp., number average molecular weight: 10,000.

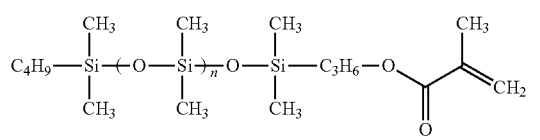

In formula (24), n is an integer to let the compound have a number average molecular weight of 10,000.

(Production of Antireflection Film)

On the hard coat layer of Optical Films 26, 30, 34, 38 and 40 produced in Example 1, the low refractive index layer-forming composition shown in Table 10 was coated in all combinations to obtain an antireflection film. Each low refractive index layer was produced under the same conditions as in the production of Antireflection Film Sample No. 53 in Example 1. The produced antireflection films were evaluated for the dust protection and pencil hardness in the same manner as in Example 1, as a result, in the optical films as the embodiment of the present invention containing a polyethylene oxide compound, the same good antistatic property (dust protection) and pencil hardness as in the case of not forming a low refractive index layer was able to be achieved as compared with the corresponding optical films not containing a polyethylene oxide compound. Also, it was revealed that in these antireflection films, low mirror reflectivity was obtained and good antireflection property was exhibited as compared with the case of not forming a low refractive index layer.

While the present invention has been shown and described with reference to certain exemplary embodiments thereof, it will be understood by those skilled in the art that various changes modifications may be made therein without departing from the spirit and scope of the present invention as defined by the appended claims.

What is claimed is:

1. An optical film comprising a transparent substrate having thereon an antistatic hard coat layer-forming composition comprising the following (a), (b), (c) and (d):
   (a) an ion-conducting compound,
   (b) a polyethylene oxide compound having one or more photopolymerizable groups, having no hydroxyl group, and having a —(CH$_2$CH$_2$O)$_k$— structure (wherein k represents a number of 1 to 50),
   (c) a compound having an unsaturated double bond, and
   (d) a photopolymerization initiator,
   wherein the ion-conducting compound (a) is a quaternary ammonium salt group-containing polymer.

2. The optical film as claimed in claim 1, wherein the ratio of the polyethylene oxide compound (b) is from 1 to 30 weight % based on the entire solid content of the antistatic hard coat layer-forming composition.

3. The optical film as claimed in claim 1, wherein the polyethylene oxide compound (b) is a compound represented by the following formula (b1):

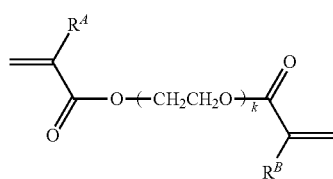

(b1)

wherein each of $R^A$ and $R^B$ independently represents a hydrogen atom or a methyl group, and
k represents a number of 1 to 50.

4. The optical film as claimed in claim 1, wherein the molecular weight of the polyethylene oxide compound (b) is 2,000 or less.

5. The optical film as claimed in claim 1, wherein the ratio of the formula weight of the —(CH$_2$CH$_2$O)$_k$— structure occupying in the molecular weight of the polyethylene oxide compound (b) is from 40 to 90%.

6. The optical film as claimed in claim 1, wherein the ion-conducting compound (a) is a polymer having at least one unit selected from structural units represented by the following formulae (I) to (III):

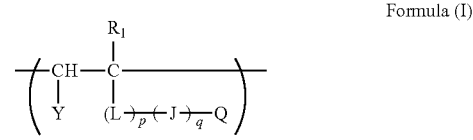

Formula (I)

wherein $R_1$ represents a hydrogen atom, an alkyl group, a halogen atom or —CH$_2$COO$^-$M$^+$,
Y represents a hydrogen atom or —COO$^-$M$^+$,
M$^+$ represents a proton or a cation,
L represents —CONH—, —COO—, —CO— or —O—,
J represents an alkylene group, an arylene group or a group composed of a combination thereof, and
Q represents a group selected from the following group A:
A:

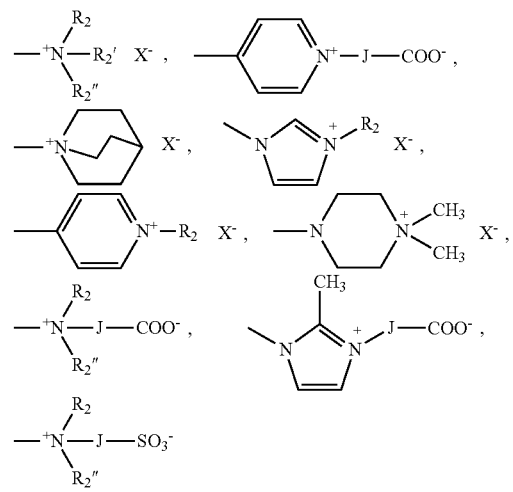

wherein each of $R_2$, $R_2'$ and $R_2''$ independently represents an alkyl group,
J represents an alkylene group, an arylene group or a group composed of a combination thereof,
X$^-$ represents an anion, and
each of p and q independently represents 0 or 1;

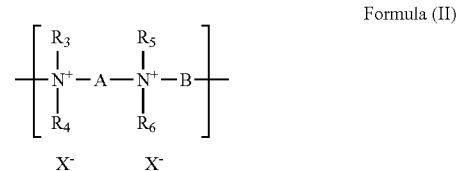

Formula (II)

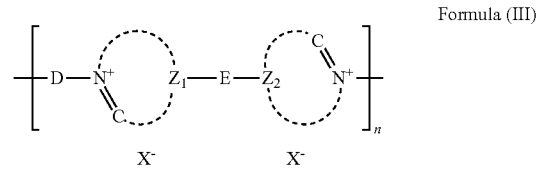

Formula (III)

wherein each of $R_3$, $R_4$, $R_5$ and $R_6$ independently represents an alkyl group, each of a pair of $R_3$ and $R_4$ and a pair of $R_5$ and $R_6$ may combine together to form a nitrogen-containing heterocyclic ring, each of A, B and D independently represents an alkylene group, an arylene group, an alkenylene group, an arylenealkylene group, —$R_7COR_8$—, —$R_9COOR_{10}OCOR_{11}$—, —$R_{12}OCR_{13}COOR_{14}$—, —$R_{15}$—$(OR_{16})_m$—, —$R_{17}CONHR_{18}NHCOR_{19}$—, —$R_{20}OCONHR_{21}NHCOR_{22}$— or —$R_{23}NHCONHR_{24}NHCONHR_{25}$—, E represents a single bond, an alkylene group, an arylene group, an alkenylene group, an arylenealkylene group, —$R_7COR_8$—, —$R_9COOR_{10}OCOR_{11}$—, —$R_{12}OCR_{13}COOR_{14}$—, —$R_{15}$—$(OR_{16})_m$—, —$R_{17}CONHR_{18}NHCOR_{19}$—, —$R_{20}OCONHR_{21}NHCOR_{22}$—, —$R_{23}NHCONHR_{24}NHCONHR_{25}$— or —$NHCOR_{26}CONH$—, each of $R_7$, $R_8$, $R_9$, $R_{11}$, $R_{12}$, $R_{14}$, $R_{15}$, $R_{16}$, $R_{17}$, $R_{19}$, $R_{20}$, $R_{22}$, $R_{23}$, $R_{25}$ and $R_{26}$ represents an alkylene group, each of $R_{10}$, $R_{13}$, $R_{18}$, $R_{21}$ and $R_{24}$ independently represents a linking group selected from an alkylene group, an alkenylene group, an arylene group, an arylenealkylene group and an alkylenearylene group, m represents a positive integer of 1 to 4, $X^-$ represents an anion, each of $Z_1$ and $Z_2$ represents a nonmetallic atom group necessary for forming a 5- or 6-membered ring together with the —N=C— group and may combine with E in a quaternary salt form =$N^+[X^-]$—, and n represents an integer of 5 to 300.

7. The optical film as claimed in claim 1,
wherein the transparent substrate is a cellulose acylate film.

8. A polarizing plate comprising the optical film as claimed in claim 1 as a polarizing plate protective film.

9. An image display device comprising the optical film as claimed in claim 1.

10. An image display device comprising the polarizing plate claimed in claim 8.

11. A method for producing an optical film having an antistatic hard coat layer on a cellulose acylate film substrate, comprising:

coating and curing the antistatic hard coat layer-forming composition claimed in claim 1 on the cellulose acylate film substrate so as to form an antistatic hard coat layer.

* * * * *